United States Patent [19]
Watanabe et al.

[11] Patent Number: 6,067,960
[45] Date of Patent: May 30, 2000

[54] METHOD AND DEVICE FOR CONTROLLING THE VOLUME OF INTAKE AIR FOR AN ENGINE

[75] Inventors: Shinji Watanabe; Tadashi Tubakiji, both of Tokyo, Japan

[73] Assignee: Mitsubishi Denki Kabushiki Kaisha, Tokyo, Japan

[21] Appl. No.: 09/087,849

[22] Filed: Jun. 1, 1998

[30] Foreign Application Priority Data

Nov. 18, 1997 [JP] Japan ................................ 9-317443

[51] Int. Cl.⁷ ........................... F02D 11/10; H02K 23/00
[52] U.S. Cl. ......................... 123/399; 318/139; 318/254
[58] Field of Search .......................... 123/339.26, 361, 123/399, 585; 318/138, 139, 254, 439, 599

[56] References Cited

U.S. PATENT DOCUMENTS 5,828,193 10/1998 Furuta ........................... 123/399 X
5,880,565 3/1999 Watanabe ........................... 318/139

FOREIGN PATENT DOCUMENTS 1-315641 12/1989 Japan.
5-240070 9/1993 Japan.

Primary Examiner—Tony M. Argenbright
Attorney, Agent, or Firm—Sughrue, Mion, Zinn, Macpeak & Seas, PLLC

[57] ABSTRACT

To improve the controllability of an energization current for a motor, when electricity is applied to each stator coil for a predetermined energization time in accordance with a plurality of energization patterns to drive a brushless motor stepwise, an energization time for a first step is made long to carry out learning of the magnetic pole position of the rotor. A current to be applied to each stator coil is controlled based on the output of a throttle opening sensor and a learned value of the magnetic pole position of the rotor obtained by the learning of the magnetic pole position of the rotor.

21 Claims, 12 Drawing Sheets

FIG. 3

| ENERGIZATION PATTERN | MAGNETIC POLE PATTERN OF EACH PHASE | | | WHEN DRIVING THROTTLE VALVE TOWARD OPEN SIDE | WHEN DRIVING THROTTLE VALVE TOWARD CLOSE SIDE |
|---|---|---|---|---|---|
| | U PHASE | V PHASE | W PHASE | | |
| ① | N POLE | S POLE | N POLE | → | ← |
| ② | N POLE | S POLE | S POLE | | |
| ③ | N POLE | N POLE | S POLE | | |
| ④ | S POLE | N POLE | S POLE | | |
| ⑤ | S POLE | N POLE | N POLE | | |
| ⑥ | S POLE | S POLE | N POLE | | |

FIG.4(a) ENERGIZATION PATTERN ①
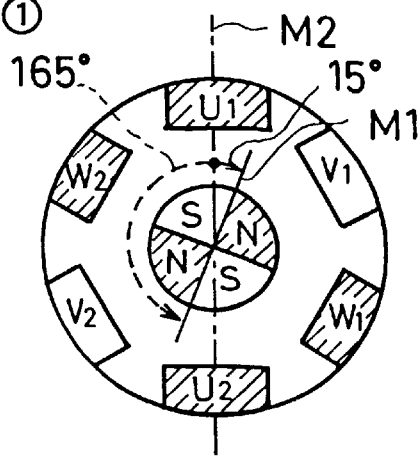
FIG.4(b) ENERGIZATION PATTERN ②
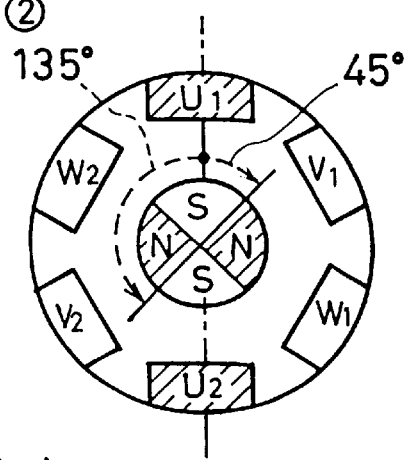
FIG.4(c) ENERGIZATION PATTERN ③
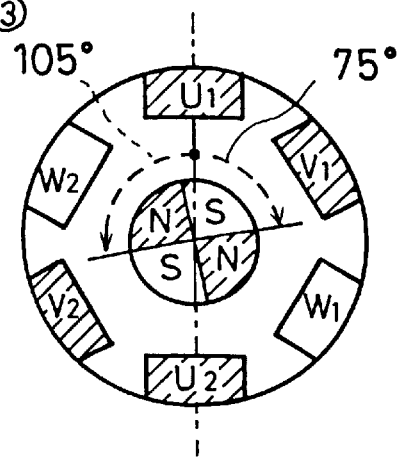
FIG.4(d) ENERGIZATION PATTERN ④
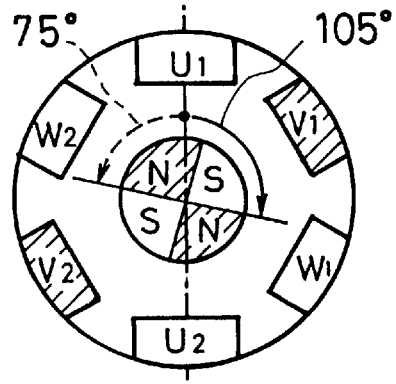
FIG.4(e) ENERGIZATION PATTERN ⑤
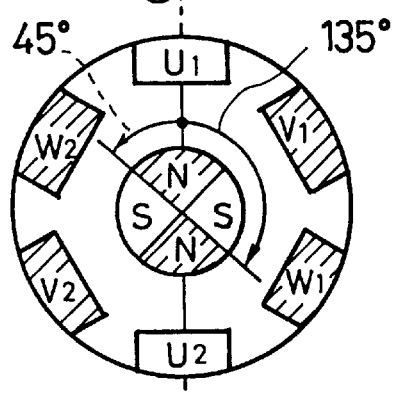
FIG.4(f) ENERGIZATION PATTERN ⑥
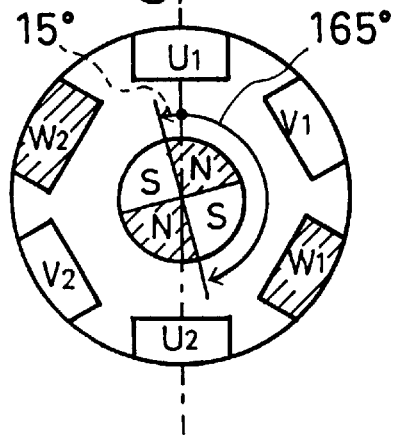

FULLY CLOSED STATE OF THROTTLE VALVE

ENERGIZATION PATTERN ①

FULLY CLOSED STATE OF THROTTLE VALVE

ENERGIZATION PATTERN ②

FIG.14 (a)   CURRENT WAVEFORM OF EACH PHASE
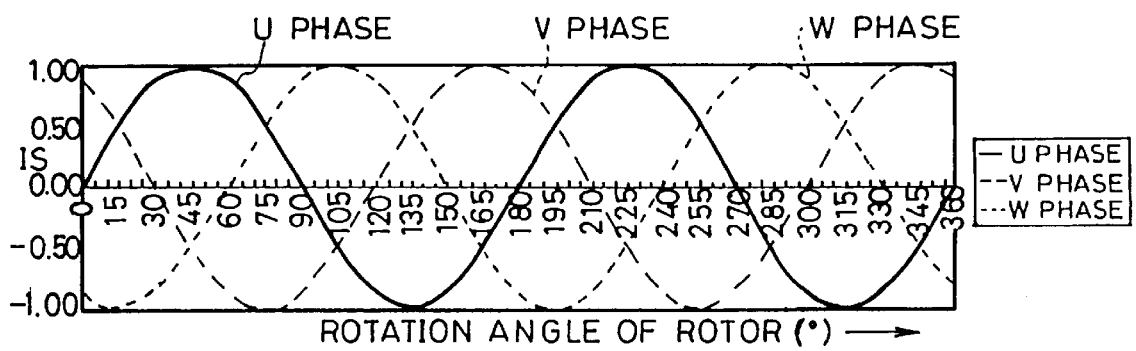
FIG.14 (b)   FLUX WAVEFORM OF EACH PHASE
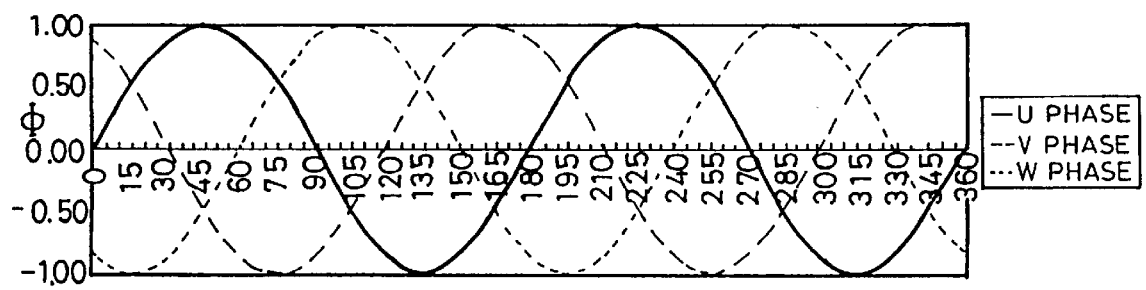
FIG.14 (c)   WAVEFORM OF OUTPUT TORQUE
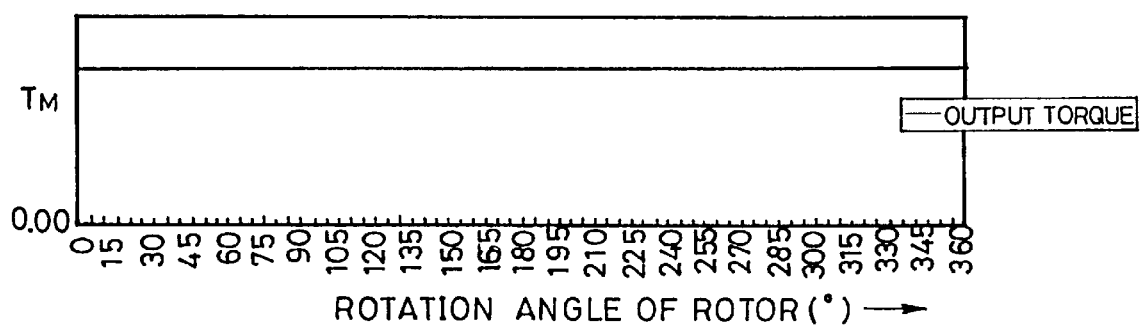

METHOD AND DEVICE FOR CONTROLLING THE VOLUME OF INTAKE AIR FOR AN ENGINE

BACKGROUND OF THE INVENTION

1. Field of the Invention

This invention relates to a device for controlling the volume of intake air for an engine by controlling the opening of a throttle valve and, particularly, to a device for controlling the volume of intake air for an engine by controlling the opening of a throttle valve using a motor.

2. Description of the Prior Art

In a general car engine control device, a throttle valve is provided in an inlet passage for sucking air to be supplied to an engine. The throttle valve opens or closes in response to the operation of an accelerator by a driver to control the volume of intake air for the engine in accordance with the operation amount of the accelerator. The control of the volume of intake air for the engine can be achieved by connecting the throttle valve and the accelerator by mechanical connection means such as a link or wire. However, in a connection method using such mechanical connection means, the relationship between the operation amount of the accelerator and the opening of the throttle valve is fixed, there is no freedom in the control of the throttle valve, and the positional relationship between the throttle valve and the accelerator is restricted, whereby the installation position of the connection means is limited when installed on an automobile.

A constant-speed running control device, traction control device and the like have recently been installed on an automobile to automatically control the running of the automobile. Therefore, the throttle valve must be controlled independently of the operation of the accelerator by the driver, and the control of the throttle valve is carried out by electrically connecting the throttle valve to a motor or the like. For example, Japanese Laid-open Patent Application No. Hei 1-315641 discloses a method for controlling the opening of a throttle valve using a brushless motor. When a motor having a brush commutator is used, a hysteresis torque is generated in a direction opposite to the normal direction of a rotor by the pressure of a brush rectifier, thereby making it difficult to control the position of a throttle valve. The method of the above publication is to control the opening of the throttle valve by driving the brushless motor stepwise. Japanese Laid-open Patent Application No. Hei 5-240070 discloses a technology for improving the controllability of a throttle valve by connecting the rotor of a brushless motor and the rotating shaft of a throttle valve through a speed reducer or gear. This publication also discloses a technology for switching a current to be supplied to the phase of a brushless motor with a reverse voltage detector for detecting a reverse voltage generated in the stator coil (to be referred to as "phase" hereinafter) of the brushless motor or a current change detector without using a high-precision rotation detector.

However, in the above-described prior art device for controlling the volume of intake air for an engine by controlling a throttle valve, as a reverse voltage detector or current change detector is required to change the energization phase of a brushless motor, a throttle actuator constituted by the throttle valve and the brushless motor for driving the throttle valve is complicated in structure and large in size, and the number of components of the signal input interface section of a controller for controlling the motor increases.

When the energization phase is changed using only the output of a throttle opening sensor, the displacement of the switching position of the energization phase occurs due to the tolerance of the characteristics of a speed reducer and throttle opening sensor.

Further, when the energization phase is changed from one to another based on the output of the reverse voltage detector or the current change detector to drive the brushless motor, a current running through the phase abruptly changes. Therefore, when the signal of the detector is shifted by a change in a magnetic field applied to the phase, the generated torques of the motor become discontinuous, thereby changing the opening of the throttle abruptly. To cope with this problem, a three-phase energization system for supplying energization currents to the U, V and W phases of the brushless motor by independent sinusoidal waves can be employed. However, a detector for measuring the rotation angle of the motor accurately is required for this three-phase energization system, whereby the throttle actuator becomes complicated in structure and large in size.

SUMMARY OF THE INVENTION

The present invention has been made to solve the above problems of the prior art and it is an object of the present invention to provide a method and device for controlling the volume of intake air for an engine, which can improve the controllability of an energization current to a motor by obtaining a learned value of the magnetic pole position of the rotor of the motor with accuracy without using a high-precision position detector.

According to a first aspect of the present invention, there is provided a method for controlling the volume of intake air for an engine which comprises driving a motor stepwise by applying electricity to each stator coil of the motor for a predetermined energization time in accordance with a plurality of energization patterns, making an energization time for a first step longer than the predetermined energization time at the time of detecting a first step position of the rotor so as to carry out the learning of the magnetic pole position of the rotor for detecting and learning the position of magnetic poles provided in the rotor of the motor based on the output of a throttle opening sensor after the first step rotation and settlement of the rotor, and controlling a current to be applied to each stator coil based on a learned value of the magnetic pole position of the rotor obtained by the learning of the magnetic pole position of the rotor and the output of the throttle opening sensor.

According to a second aspect of the present invention, there is provided a device for controlling the volume of intake air for an engine which comprises stepwise drive pattern setting means for setting a plurality of energization patterns for driving the motor stepwise, stepwise drive energization time setting means for setting an energization time for each of the above energization patterns, rotor step position detection means for detecting which one of the energization patterns is used to drive the motor stepwise, and rotor magnetic pole position learning means for detecting and learning the position of magnetic poles provided in the rotor of the motor based on the output of the throttle opening sensor, wherein an energization time for a first step is made longer than the predetermined energization time at the time of detecting a first step position of the rotor so as to carry out the learning of the magnetic pole position of the rotor after the first step rotation and settlement of the rotor.

According to a third aspect of the present invention, there is provided a device for controlling the volume of intake air for an engine which comprises learning start judging means for judging that the learning of the magnetic pole position of the rotor can be started when an ignition switch is off, wherein when the learning start judging means judges that learning can be started, the learning of the magnetic pole position of the rotor is carried out.

According to a fourth aspect of the present invention, there is provided a device for controlling the volume of intake air for an engine, wherein the learning start judging means for judging that the learning of the magnetic pole position of the rotor can be started judges that the learning of the magnetic pole position of the rotor can be started when the ignition switch is off and the engine is not running.

According to a fifth aspect of the present invention, there is provided a device for controlling the volume of intake air for an engine which comprises throttle valve fully closed position learning means for learning the fully closed position of the throttle valve based on the output of the throttle opening sensor, wherein the learning of the fully closed position of the throttle valve is carried out before the learning of the magnetic pole position of the rotor.

According to a sixth aspect of the present invention, there is provided a device for controlling the volume of intake air for an engine, wherein when a throttle opening voltage after an elapse of a predetermined time right after the output of an energization pattern is equal to or larger than the total of a learned value of the fully closed position of the throttle valve and a predetermined voltage value, the rotor step position detection means judges that the energization pattern is an energization pattern for first step rotation.

According to a seventh aspect of the present invention, there is provided a device for controlling the volume of intake air for an engine, wherein an energization pattern to be applied to each stator coil of the motor is not renewed for a predetermined time when the rotor step position detection means carries out the detection of first step rotation.

According to an eighth aspect of the present invention, there is provided a device for controlling the volume of intake air for an engine, wherein an energization pattern to be applied to each stator coil of the motor is maintained for a preset energization time for first step rotation when the rotor step position detection means carries out the detection of the first step rotation and a throttle opening voltage which is smaller than a preset variation width in the above energized state is taken as a magnetic pole position of the rotor at the first step position.

According to a ninth aspect of the present invention, there is provided a device for controlling the volume of intake air for an engine which comprises initial value storing means, wherein a learned magnetic pole position of the rotor at the first step position and an energization pattern for the first step are stored in the initial value storing means at the time of detecting the first step rotation of the rotor according to the energization pattern.

According to a tenth aspect of the present invention, there is provided a device for controlling the volume of intake air for an engine, wherein the energization time of an energization pattern to be applied to each stator coil of the motor is made a predetermined energization time preset by the stepwise drive energization time setting means after the detection of the magnetic pole position of the rotor at the first step position.

According to an eleventh aspect of the present invention, there is provided a device for controlling the volume of intake air for an engine which comprises throttle valve fully open position learning means for learning the fully open position of the throttle valve from the output of the throttle opening sensor, wherein the throttle valve fully open position learning means carries out the learning of the fully open position of the throttle valve when a step position of the rotor detected by the rotor step position detection means is within a predetermined step position range and a difference between a learned value of the magnetic pole position of the rotor at the step position and a learned value of the magnetic pole position of the rotor at a step position right before the detection of the above step position is equal to or small than a predetermined value.

According to a twelfth aspect of the present invention, there is provided a device for controlling the volume of intake air for an engine, wherein a learned value calculated by the rotor magnetic pole position learning means is stored in a backup RAM and an EEPROM. The backup RAM and EEPROM are installed in a device for controlling the volume of intake air for an engine or an electronic controller for an automobile equipped with the device for controlling the volume of intake air for an engine. The backup RAM may also function as the initial value storing means in the ninth aspect of the present invention.

According to a thirteenth aspect of the present invention, there is provided a device for controlling the volume of intake air for an engine, wherein a learned value of the magnetic pole position of the rotor is read from the EEPROM and stored in the backup RAM right after the removal of a battery.

According to a fourteenth aspect of the present invention, there is provided a device for controlling the volume of intake air for an engine, wherein a learned value calculated by the rotor magnetic pole position learning means is written to the EEPROM at intervals of a predetermined number of times of the learning start judging operation of the learning start judging means.

According to a fifteenth aspect of the present invention, there is provided a device for controlling the volume of intake air for an engine which comprises throttle valve fully closed position learning means for learning the fully closed position of the throttle valve based on the output of the throttle opening sensor, wherein the learning of the fully closed position of the throttle valve is carried out after the learning of the magnetic pole position of the rotor.

According to a sixteenth aspect of the present invention, there is provided a device for controlling the volume of intake air for an engine which comprises throttle valve fully closed position learning means for learning the fully closed position of the throttle valve based on the output of the throttle opening sensor, wherein the learning of the fully closed position of the throttle valve is carried out before and after the learning of the magnetic pole position of the rotor and an average value of the learned values of the fully closed position of the throttle valve is taken as a learned value of the fully closed position of the throttle valve.

According to a seventeenth aspect of the present invention, there is provided a device for controlling the volume of intake air for an engine, wherein when the opening of the throttle valve is equal to or larger than a predetermined opening at the time of the learning start judging means' judging that learning can be started, a learned value of the fully closed position of the throttle valve fully closed position learning means is used as a target opening until the opening of the throttle valve falls below the predetermined opening and the throttle valve is returned to its fully closed position by the feedback control of the opening.

According to an eighteenth aspect of the present invention, there is provided a device for controlling the volume of intake air for an engine, wherein when the opening of the throttle valve is equal to or smaller than a predetermined opening at the time of the learning start judging means' judging that learning can be started, the output of the drive signal of the motor drive means is stopped.

According to a nineteenth aspect of the present invention, there is provided a device for controlling the volume of intake air for an engine, wherein the throttle valve fully closed position learning means stores an output value of the throttle opening sensor after an elapse of a predetermined time from the time when the throttle valve opening falls below a predetermined opening and a change in opening voltage falls below a predetermined value as a learned value of the fully closed position of the throttle valve.

According to a twentieth aspect of the present invention, there is provided a device for controlling the volume of intake air for an engine, wherein the learning of the magnetic pole position of the rotor is not carried out when the learning of the fully closed position of the throttle valve is not completed.

The above and other objectives, features and advantages of the invention will become more apparent from the following description when taken in conjunction with the accompanying drawings.

BRIEF DESCRIPTION OF THE DRAWINGS

FIG. 3 is a table showing the magnetic pole of each phase in each energization pattern;

FIGS. 4a to 4f are diagrams showing the magnetic pole position relationship between stators and a rotor in each energization pattern;

FIGS. 14a to 14c are diagrams showing the relationship between the rotation angle of a rotor, and the current waveform and flux waveform of each phase and the waveform of an output torque in a sinusoidal wave energization system according to Embodiment 1.

DETAILED DESCRIPTION OF THE PREFERRED EMBODIMENTS

Preferred embodiments of the present invention will be described below with reference to the accompanying drawings.

Embodiment 1

Figure 1:
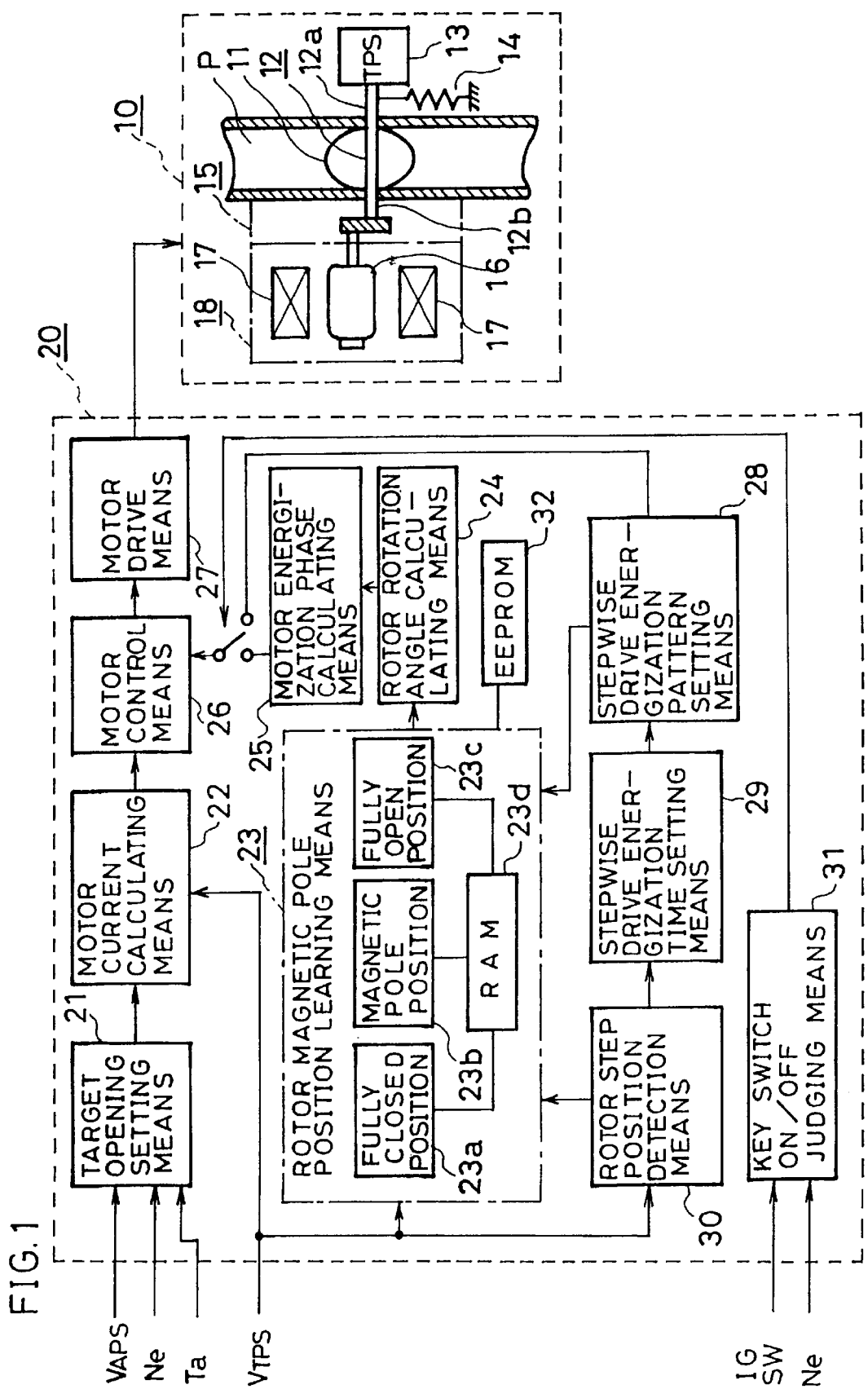
FIG. 1 is a diagram showing the configuration of a device for controlling the volume of intake air for an engine according to the present invention.

FIG. 1 is a diagram showing the configuration of a system for controlling a throttle valve using a device for controlling the volume of intake air for an engine according to Embodiment 1 of the present invention. Reference numeral 10 denotes a throttle actuator for adjusting the volume of intake air for an unshown engine and 20 a device for controlling the volume of intake air for the engine, which controls the throttle actuator 10. The throttle actuator 10 comprises a throttle valve 11 for changing the opening area of an intake air passage P, a rotation shaft 12 for supporting the throttle valve 11, a throttle opening sensor (TPS) 13, provided at one end 12a of the rotation shaft 12, for detecting the rotation angle (throttle opening) of the rotation shaft 12, a return spring 14, provided at the end 12a of the rotation shaft 12, for urging the throttle valve toward its closing direction, a speed reducer 15 mechanically connected to the other end 12b of the rotation shaft 12, and a brushless motor 18 having stator coils 17 and a rotor 16 connected to the speed reducer 15.

The device 20 for controlling the volume of intake air for an engine comprises target opening setting means 21 for calculating a target opening $\theta_0$ of the throttle valve based on various car information such as an output value $V_{APS}$ indicative of the operation amount of an unshown accelerator of an accelerator opening sensor (APS), engine speed Ne and engine cooling water temperature Ta, motor phase current calculating means 22 for calculating a motor phase current from an opening difference $\Delta\theta$ between this target opening $\theta_0$ of the throttle valve and an actual opening $\theta_r$ of the throttle valve which is an input signal from the throttle opening sensor (TPS) 13, rotor magnetic pole position learning means 23 for detecting and learning the magnetic pole positions of the rotor 16 with the throttle opening sensor 13 by driving the brushless motor 18 stepwise, rotor rotation angle calculating means 24 for obtaining the rotation angle of the rotor 16 from the output of the throttle opening sensor 13 and the learned value of the rotor magnetic pole position learning means 23, motor energization phase calculating means 25 for calculating the energization ratio of each of the stator coils 17 based on the rotation angle of the rotor obtained from the rotor rotation angle calculating means 24, motor control means 26 for outputting a PWM duty equivalent to the current value of each stator coil 17 based on a current value from the motor phase current calculating means 22 and the energization ratio from the motor energization phase calculating means 25, motor drive means 27 for supplying a current to the brushless motor 10 based on a drive signal from the motor control means 26, stepwise drive energization pattern setting means 28 for setting a current application pattern to be supplied to each stator coil 17 when the brushless motor 18 is driven stepwise, stepwise drive energization time setting means 29 for setting the energization time of the stepwise drive energization pattern, rotor step position detection means 30 for detecting which one of the energization patterns is used to drive the brushless motor 18 to a first step position, key switch ON/OFF judging means 31 as learning start judging means for judging whether the learning of the magnetic pole position of the rotor can be started or not based on an ignition switch signal and engine speed data Ne, and an EEPROM 32 for storing a learned value of the magnetic pole position of the rotor.

The rotor magnetic pole position learning means 23 comprises throttle fully closed position learning means 23a for detecting and learning a magnetic pole position of the rotor 16 at the fully closed position of the throttle valve, magnetic pole position learning means 23b for detecting and learning a magnetic pole position of the rotor 16 during stepwise driving, throttle fully open position learning means 23c for detecting and learning a magnetic pole position of the rotor 16 at the fully open position of the throttle valve, and a back-up RAM 23d for temporarily storing a magnetic pole position of the throttle valve and the like. When the judgment result of the key switch ON/OFF judging means 31 is OFF and the brushless motor 18 is driven based on an energization pattern from the stepwise drive energization pattern setting means 28 and an energization time from the stepwise drive energization time setting means 29, the magnetic pole position of the rotor 16 of the brushless motor 18 is learned. The backup RAM 23d is an initial value storing means for storing a learned value of the magnetic pole position of the rotor when the rotor step position detection means 30 carries out the detection of the first step rotation of the rotor in accordance with on an energization pattern and the energization pattern.

Figure 2:
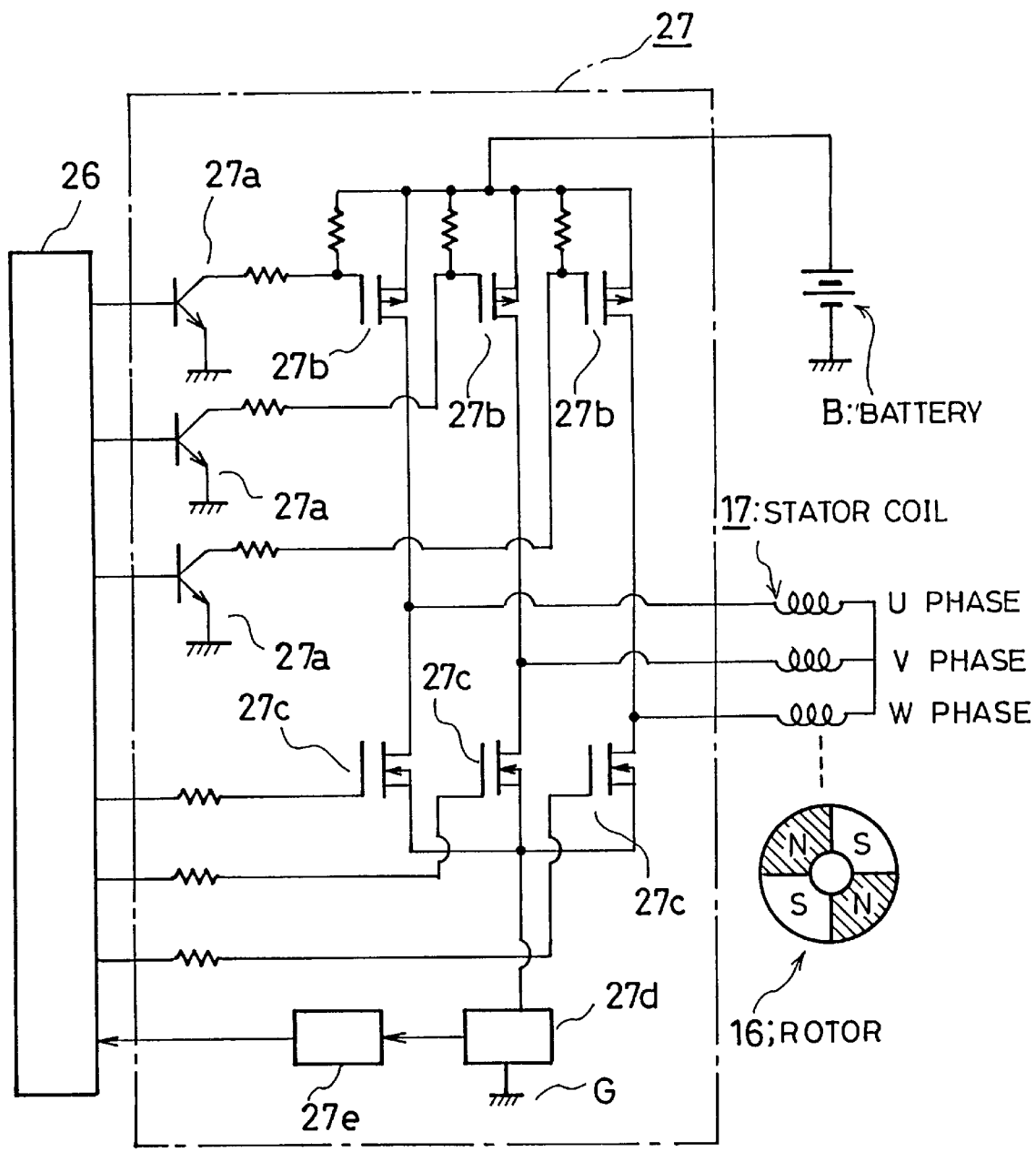
FIG. 2 is a diagram showing the details of motor drive means.

FIG. 2 is a structural diagram showing the details of the motor drive means 27. The motor drive means 27 comprises first-stage switching elements 27a and last-stage switching elements 27b for driving an up-stream side drive stage of a 3-phase bridge circuit of the stator coils 17 consisting of U, V and W phases by a drive current from the motor control means 26, switching elements 27c for driving a down-stream side drive stage, a current detector 27d for detecting a current running through each of the stator coils 17, and an overcurrent detector 27e. The output of the overcurrent detector 27e is applied to the motor control means 26. The overcurrent detector 27e protects the brushless motor 18 from an overcurrent by turning off a motor drive signal from the motor control means 26 when an overcurrent is detected. The U, V and W phases of the stator coils 17 are connected between the battery B and the ground G through the last-stage switching elements 27b and the switching elements 27c. That is, the motor drive means 27 controls the switching elements 27a by a PWM duty output from the motor control means 26 to control the phase of a current running through each phase of the stator coils 17 and rotate the rotor 16.

The operation of the above-structured device 20 for controlling the volume of intake air for an engine will be described below.

A description is first given of the learning operation of the fully closed position of the throttle valve.

When the ignition switch signal is off and the engine speed Ne is "0", the key switch ON/OFF judging means 31 judges whether the key switch is on. Upon judging that the key switch is off, the fully closed position learning means 23a sets the target opening voltage to a learned value of the fully closed position to return the throttle valve 11 to its fully closed position by opening feed-back control when the throttle opening voltage is equal to or higher than a predetermined opening voltage (for example, 0.7 V), turns off the drive signal of the motor control means 26 when the throttle opening voltage falls below the above predetermined opening voltage so as to return the throttle valve 11 to its fully closed position by the urging force of the return spring 14, and stores an output voltage (throttle opening voltage) from the throttle opening sensor 13 in the RAM 23d as a learned value of the fully closed position when the throttle valve 11 becomes fully stable at its fully closed position (for example, after an elapse of a predetermined time, for example, 0.5 sec after an opening voltage change becomes 20 mV or less at a sampling cycle of around 15 ms). When the throttle opening voltage is smaller than the predetermined opening voltage, after it is confirmed that the throttle valve 11 is stable at its fully closed position, an output voltage from the throttle opening sensor 13 is stored in the RAM 23d as a learned value of the fully closed position. Since the learning of the magnetic pole position of the rotor is carried out after the learning of the fully closed position, the learning operation of the magnetic pole position of the rotor is inhibited when the learning of the fully closed position is not completed.

A description is subsequently given of the learning operation of the magnetic pole position of the rotor.

When the ignition switch signal is off, the engine speed Ne is "0", the key switch ON/OFF judging means 31 judges that the key switch is on, and the fully closed position learning means 23a completes learning the fully closed position, the device 20 for controlling the volume of intake air for an engine proceeds to the learning operation of the magnetic pole position of the rotor by means of the magnetic pole position learning means 23b.

The motor control means 26 outputs to the motor drive means 27 a PWM duty equivalent to the phase current of each stator coil 17 based on a constant duty (for example, 50%) calculated to supply a motor phase current equivalent to a drive torque required for the stepwise rotation of the rotor 16 of the throttle actuator 10 and an energization ratio determined by six energization patterns, for example, and output to the motor control means 26 and sends an instruction to change the energization patterns sequentially in the direction of opening the throttle valve 11. Due to this operation, the rotor 16 of the brushless motor 18 rotates stepwise at an angle of 30°, for example, each time the output of the energization pattern is changed.

FIG. 3 shows the relationship among energization patterns (1) to (6), magnetic pole generated in each phase (U, V and W phases) of the stator coils 17, and the direction of driving the throttle valve 11 when the rotor 16 of the brushless motor 18 having 3 phases and 4 poles is driven stepwise. An energization phase in which a phase current runs into the stator coils 17 is shown by an S pole (upstream side) and an energization phase in which a phase current runs out from the stator coils 17 is shown by an N pole (downstream side). FIGS. 4a to 4f show the magnetic pole position relationship between the stator coils 17 and the rotor 16 when the rotor 16 rotates stepwise according to the above energization patterns (1) to (6) and settles after the throttle valve is at its fully closed position (initial arrangement). The blank magnetic poles of the stator coils 17 are S poles and the magnetic poles indicated by slant lines are N poles. As for the initial position of assembly, the stator coils 17 of the brushless motor 18 are not energized, the throttle valve 11 is returned to its fully closed position, and the stator coils 16 and the rotor 17 are arranged in such a manner that the boundary line M1 of the magnetic field of the rotor and the U-phase reference line M2 of the stator coils are aligned with each other. In FIG. 4, the rotation angle of the rotor indicated by a solid line is a rotation angle when the rotation direction is clockwise and the rotation angle of the rotor indicated by a dotted line is a rotation angle when the rotation direction is counterclockwise when the throttle valve is driven in its opening direction.

In accordance with the energization pattern (1), as shown in FIG. 4a, the rotor 16 rotates at an angle of 15° in a fully opening direction of the throttle valve from its initial position of assembly (fully closed position of the throttle valve) and settles. Subsequently, according to the energization pattern (2), as shown in FIG. 4b, the rotor 16 further rotates at an angle of 30° in a fully opening direction of the throttle valve and settles at an angle of 45° from its initial position. Similarly, when the energization pattern is changed to the energization patterns (3) to (6) sequentially, as shown in FIGS. 4c to 4f, the rotor 16 rotates at 30° each time to drive the throttle valve 1 toward its fully open side.

Figure 5:
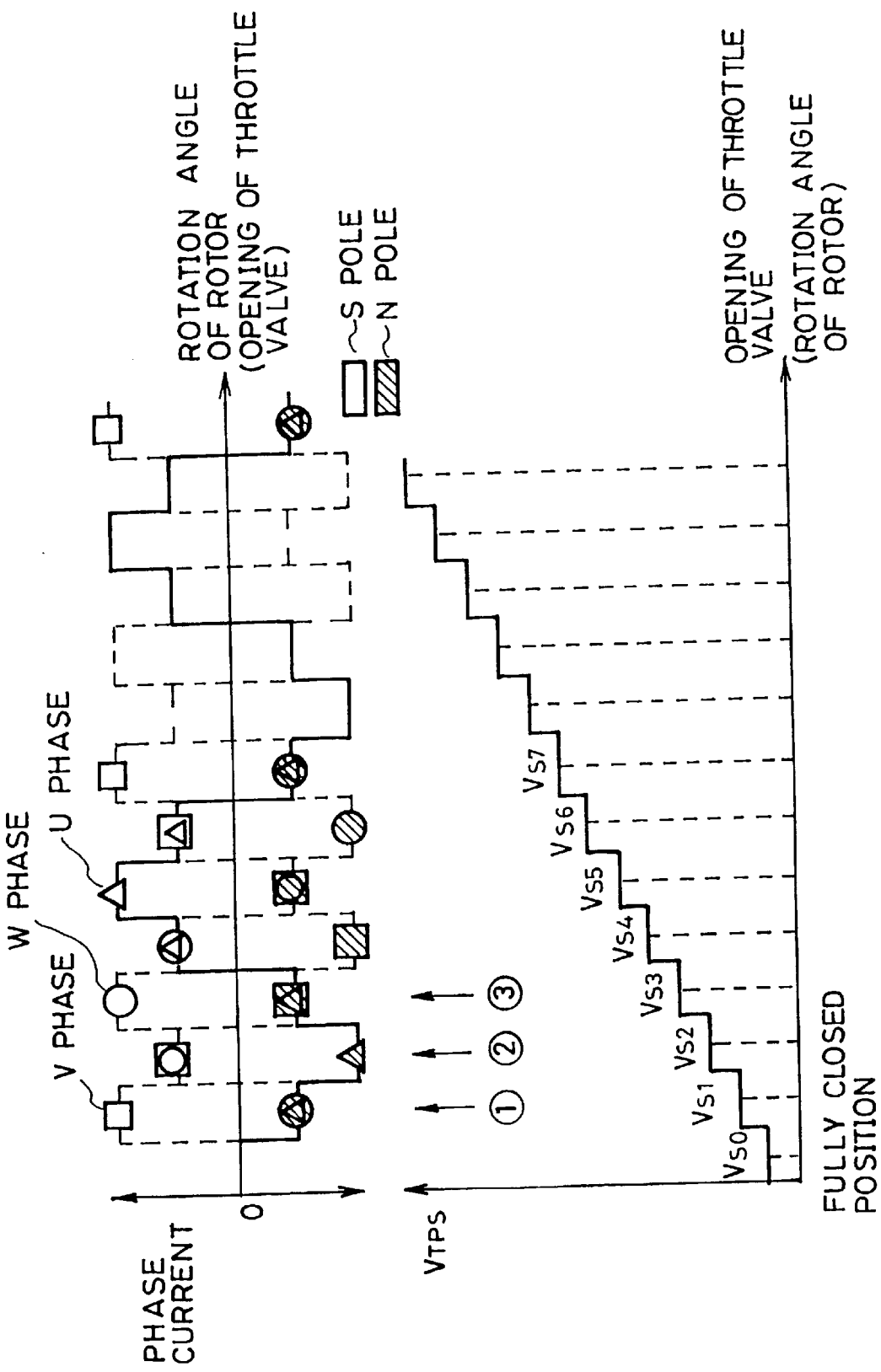
FIG. 5 is a diagram showing the relationship between energization pattern and TPS voltage at the time of driving a motor stepwise.

FIG. 5 shows the relationship among energization patterns for the U phase (Δ), V phase (□) and W phase (○) of the above stator coils, current and magnetic pole pattern of each phase, the step position of the rotor 16 in each energization pattern, throttle opening and TPS voltage when the rotor 16 of the brushless motor 18 is driven stepwise at the time of learning the magnetic pole position of the rotor. In the figure, Δ indicates U phase, □ indicates V phase and ○ indicates W phase, the blank magnetic pole of each phase is an S pole and the magnetic pole indicated by slant lines is an N pole.

In a non-energized state, the throttle valve 11 is at its fully closed position, and a TPS voltage value $V_{TPS}$ at this point is equal to $V_{S0}$. According to the energization pattern (1), a phase current runs into the V phase to form an S pole and a phase current runs out from the W and U phases to form an N pole. Due to attraction force generated by the magnetic poles of the stator coils 17 and the magnetic poles of the rotor 16, the rotor 16 rotates stepwise and settles at a position where the TPS voltage $V_{TPS}$ becomes equal to $V_{S1}$ (see FIG. 4a). Similarly, as a phase current runs into the V and W phases to form an S pole and a phase current runs out from the U phase to form an N pole according to the energization pattern (2), due to attraction force generated by the magnetic poles of the stator coils 17 and the magnetic poles of the rotor 16, the rotor 16 rotates stepwise and settles at a position where the TPS voltage $V_{TPS}$ becomes equal to $V_{S2}$ (see FIG. 4b). In this way, each time the energization pattern is changed to (3), (4) . . . , the rotor 16 rotates stepwise and settles, the rotation angle of the rotor increases, and the TPS voltage $V_{TPS}$ indicative of the opening of the throttle valve increases stepwise from $V_{S3}$, to $V_{S4}$, . . .

Since the positional relationship between the magnetic pole position of the rotor 16 of the brushless motor 18 and the stator coils 17 is not adjusted at the time of assembly, it is unknown which energization pattern from the stepwise drive energization pattern setting means 28 is used to start stepwise rotation.

Figure 6A:
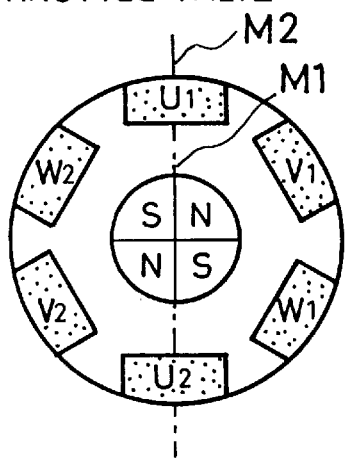
FIGS. 6a and 6b are diagrams showing a step position in a rotor assembled state A.
Figure 6B:
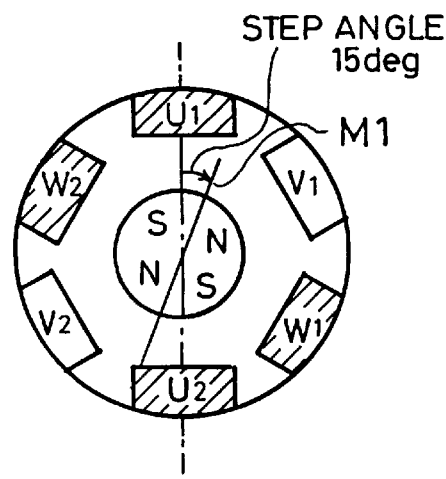
Figure 7:
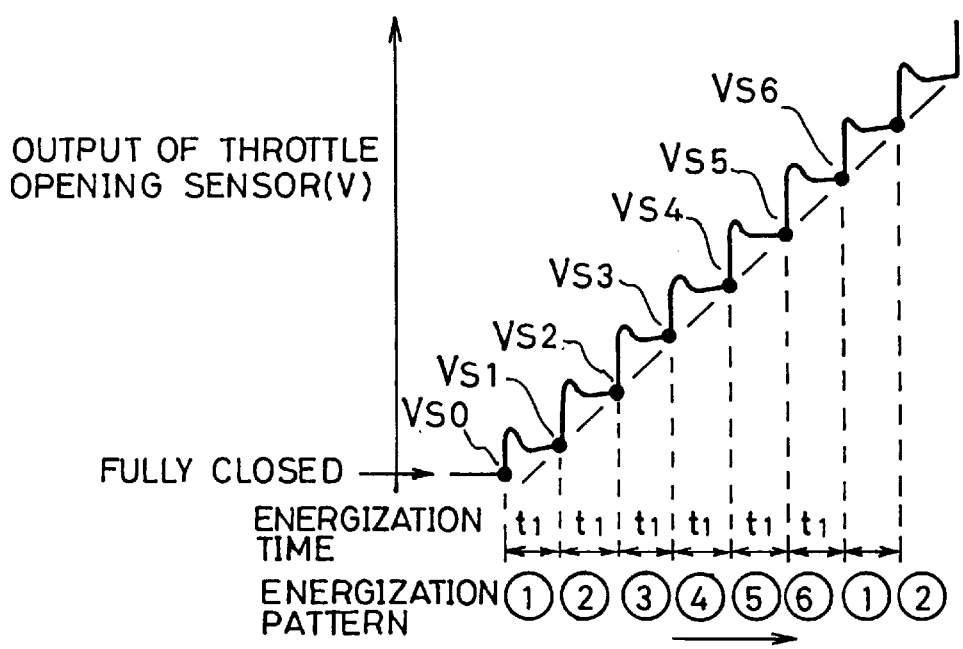
FIG. 7 is a time chart showing stepwise rotation in the rotor assembled state A.

For instance, as shown in FIG. 6a, when the stator coils 17 of the brushless motor 18 are not energized, the throttle valve 11 is returned to its fully closed position by the return spring 14, and the stator coils 17 and the rotor 16 are arranged in such a manner that the boundary line M1 of the magnetic field of the rotor and the U-phase reference line M2 of the stator coils are aligned with each other (assembly state A) like the above initial position of assembly, the rotor 16 rotates stepwise at an angle of 15° and settles according to the energization pattern (1) from the stepwise drive energization pattern setting means 28 as shown in FIG. 6b. Subsequently, by changing the energization pattern sequentially, as shown in the graph of FIG. 7, each time the energization pattern is changed, the output voltage of the throttle opening sensor 13 increases stepwise. That is, in a non-energized state, the throttle valve 11 is at its fully closed position and the TPS voltage value $V_{TPS}$ at this point is equal to $V_{S0}$. Thereafter, during a predetermined energization time $t_1$ from the stepwise drive energization time setting means 29, the rotor 16 is rotated at an angle of 15° and settled at a position where the TPS voltage value $V_{TPS}$ becomes equal to $V_{S1}$ according to the energization pattern (1). The rotor magnetic pole position learning means 24 reads the TPS voltage value $V_{S1}$ as a learned value of the magnetic pole position of the rotor. According to the energization patterns (2) to (6), the rotor 16 is similarly rotated stepwise at 30° each time and settled at a position where the TPS voltage becomes equal to $V_{S2}$ to $V_{S6}$, respectively. Therefore, the rotor magnetic pole position learning means 24 reads the TPS voltage values $V_{S2}$ to $V_{S6}$ as learned values of the magnetic pole position of the rotor at respective step positions. In this way, in an assembly state shown in FIG. 6A, the learned value of the magnetic pole position of the rotor at a first step position is a value at a position of 15° in terms of the rotation angle of the rotor from the fully closed position.

Figure 8A:
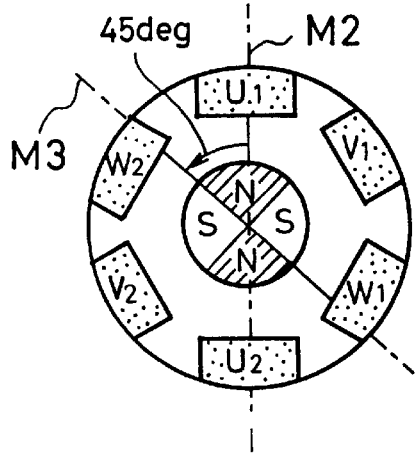
FIGS. 8a and 8b are diagrams showing a step position in a rotor assembled state B.
Figure 8B:
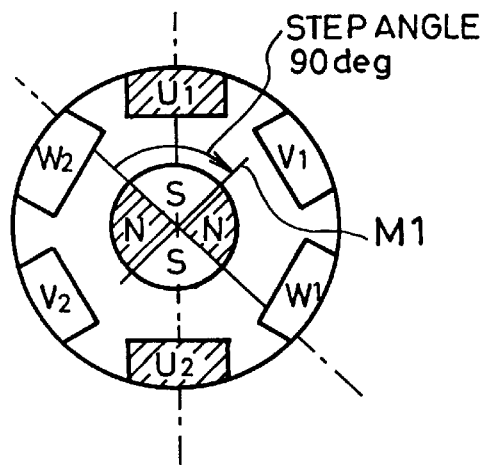
Figure 9:
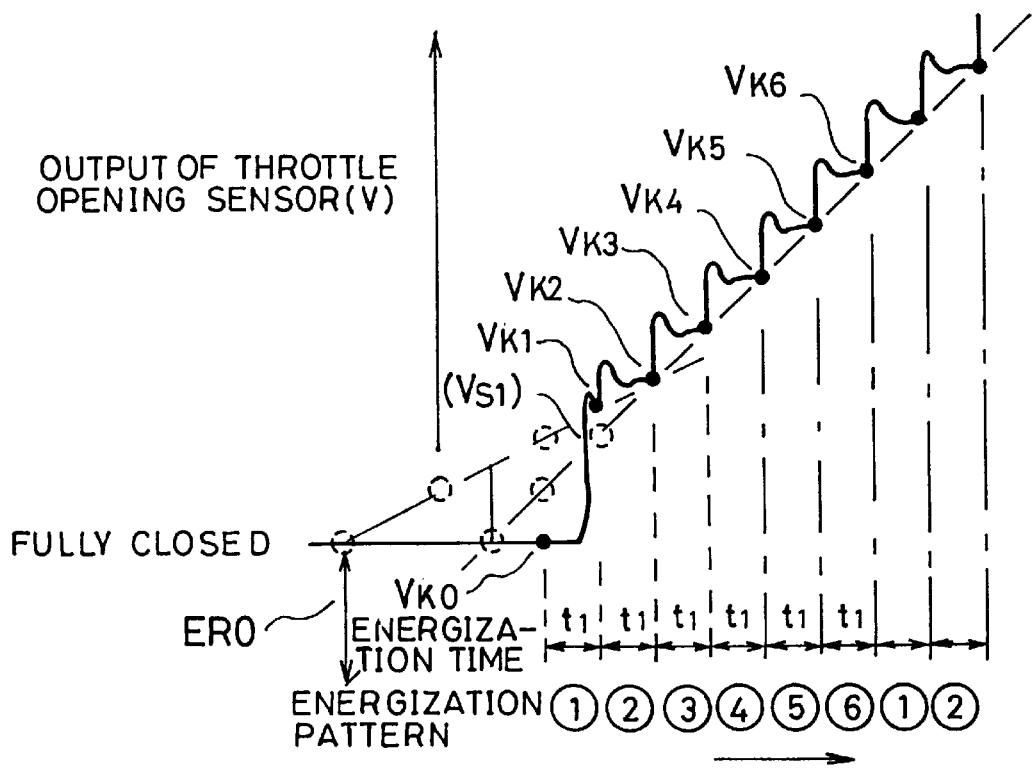
FIG. 9 is a time chart showing stepwise rotation in the rotor assembled state B.

Meanwhile, as shown in FIG. 8a, while the stator coils 17 of the brushless motor 18 are not energized, the throttle valve 11 is returned to its fully closed position by the return spring 14, and the stator coils 17 and the rotor 16 are arranged (assembly state B) in such a manner that the boundary line M1 of the magnetic field of the rotor is shifted from the U-phase reference line M2 of the stator coils at 45° in a counterclockwise direction, when the rotor 16 is driven stepwise according to the energization pattern (1) from the stepwise drive energization pattern setting means 28 for a predetermined energization time $t_1$ from the stepwise drive energization time setting means 29, the rotation of the rotor 16 is delayed and the energization pattern is changed to the energization pattern (2) while the position of the rotor 16 is not settled. Therefore, as shown in FIG. 8b, in the energization pattern (2), the rotor 16 rotates stepwise at an angle of 90° and settles. FIG. 9 is a graph showing the relationship between energization patterns and TPS voltage for the stepwise rotation of the rotor when the initial state is such as shown in FIG. 8a. In a non-energized state, the throttle valve 11 is at its fully closed position and the TPS voltage value $V_{TPS}$ at this point is $V_{K0}$. When the rotor 16 is driven in accordance with the energization pattern (1) for a predetermined energization time $t_1$ from the stepwise drive energization time setting means 29, the rotation of the rotor is delayed because the boundary line M of the magnetic field of the rotor is displaced from the U-phase reference line M2 of the stator coils, and the energization pattern is changed to the energization pattern (2) when the rotor rotates at an angle of 60° or more (see FIG. 8b). Therefore, the rotor magnetic pole position learning means 24 reads a voltage value $V_{K1}$ larger than the above TPS voltage value $V_{S1}$ as a learned value of the magnetic pole position of the rotor. Thereafter, the rotor 16 rotates stepwise at an angle of 30° and settles at a position where the TPS voltage becomes equal to $V_{K2}$ according to the energization pattern (2). According to the energization patterns (3) to (6), the rotor 16 rotates at an angle of 30° each time and settles at a position where the TPS voltage becomes equal to $V_{K3}$ to $V_{K6}$, respectively.

Thus, in an assembly state (assembly state B) shown in FIG. 8a, as an unstable position which is a rotation angle of the rotor of 15° or more from the fully closed position is read as a learned value of the magnetic pole position of the rotor, a detection error of the magnetic pole position ($V_{S1}$–$V_{K1}$) is produced. Since the calculation of the fully closed position of the throttle valve 11 is carried out by an extrapolation method using the above first and second learned values of the magnetic pole position of the rotor ($V_{K1}$ and $V_{K2}$), as shown in FIG. 9, the detection error (ERO) of the magnetic pole position at the fully closed position of the throttle valve is significantly large. Therefore, a reduction in motor generation torque caused by the detection error (ERO) of the magnetic pole position is large near at the fully closed position of the throttle valve and the throttle valve cannot be controlled in the worst case.

Figure 10:
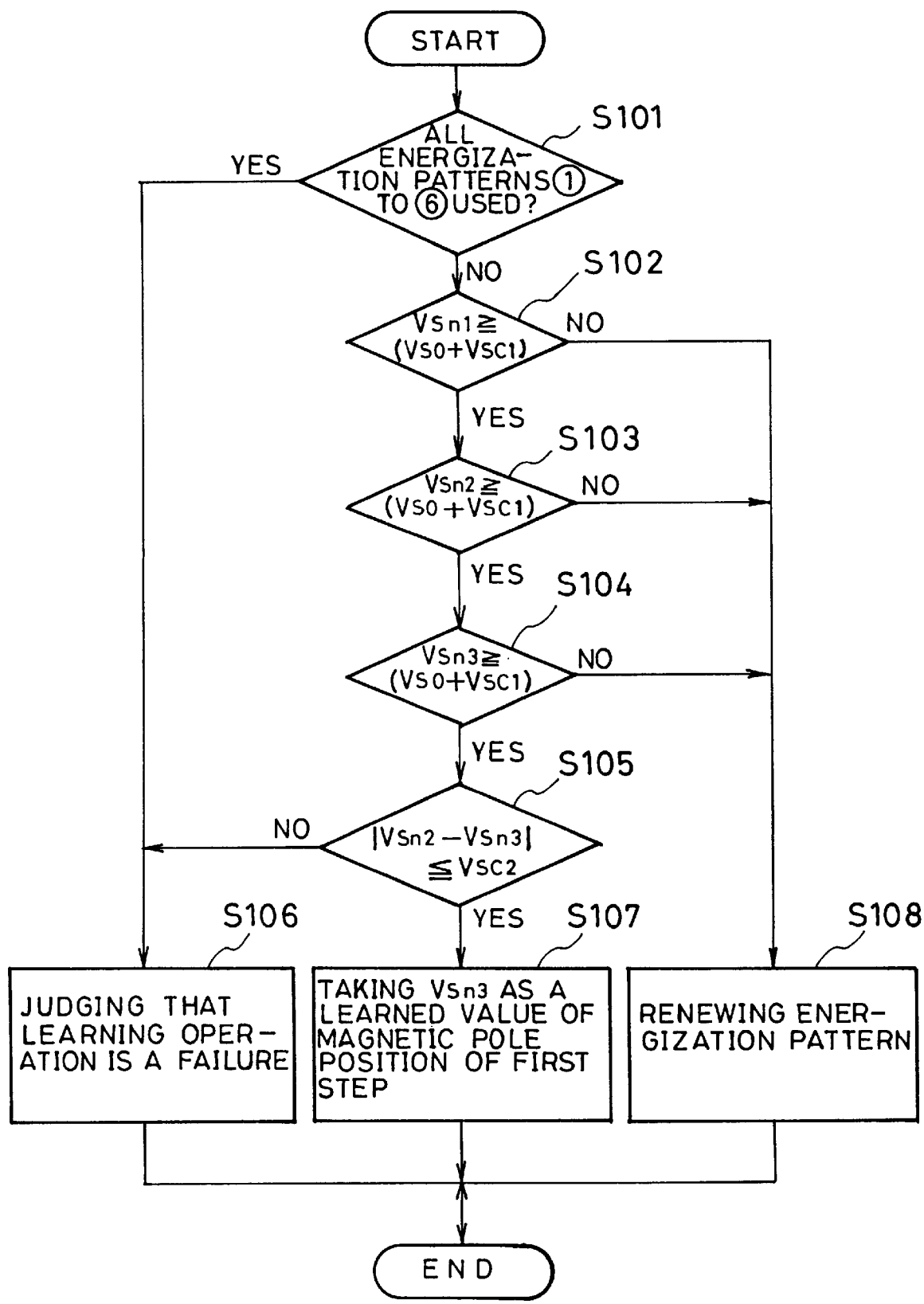
FIG. 10 is a control flow chart for driving a rotor stepwise according to Embodiment 1.

In Embodiment 1 of the present invention, a learned value of the magnetic pole position of the rotor is obtained in accordance with a rotor stepwise drive control flow chart for reading and judging a learned value of the magnetic pole position of the rotor shown in FIG. 10. It is first judged whether all the energization patterns n (1) to (6) for driving the rotor 16 stepwise are used (step S101). When all the energization patterns are used, as the detection of a first step position could not be carried out in the energization patterns (1) to (6), the routine proceeds to step S106 to judge that the learning operation of the magnetic pole position of the rotor is a failure and complete the processing. When all the energization patterns are not used, a first predetermined voltage value $V_{SC1}$ (for example, 50 mW) and a second predetermined voltage value $V_{SC2}$ (for example, 30 mV) are set, the TPS voltage $V_{Sn1}$ when driving stepwise in accordance with the energization pattern n is measured, and it is judged whether the TPS voltage $V_{Sn1}$ satisfies $V_{Sn1} \geq (V_{S0} + V_{SC1})$ (step S102). When $V_{Sn1}$ does not satisfy the above condition, the routine proceeds to step S108 to renew the energization pattern (n=n+1) and complete the processing.

When the above TPS voltage $V_{Sn1}$ satisfies the above condition, the energization pattern n is maintained for a predetermined time, for example, the same time as the energization time $t_1$, the TPS voltage $V_{Sn2}$ when driving stepwise in accordance with the energization pattern n is measured, and it is judged whether the TPS voltage $V_{Sn2}$ satisfies $V_{Sn2} \geq (V_{S0} + V_{SC1})$ (step S103). When the TPS voltage $V_{Sn2}$ does not satisfy the above condition, the routine proceeds to step S108 to renew the energization pattern (n=n+1) and complete the processing.

When the TPS voltage $V_{Sn2}$ satisfies the above condition, the energization pattern n is still maintained for a predetermined energization time $t_1$, the TPS voltage $V_{Sn3}$ when driving stepwise in accordance with the energization pattern n is measured, and it is judged whether this TPS voltage $V_{Sn3}$ satisfies $V_{Sn3} \geq (V_{S0} + V_{SC1})$ (step S104). When the TPS voltage $V_{Sn3}$ does not satisfy the above condition, the routine proceeds to step S108 to renew the energization pattern (n=n+1) and complete the processing.

When the above TPS voltage $V_{Sn3}$ satisfies the above condition, it is judged whether a difference between $V_{Sn2}$ and $V_{Sn3}$ satisfies $|V_{Sn2} - V_{Sn3}| \leq V_{SC2}$ (step S105). When the difference between $V_{Sn2}$ and $V_{Sn3}$ does not satisfy the above condition, the routine proceeds to step S106 to judge that the learning operation of the magnetic pole position of the rotor is a failure and complete the processing. When the TPS voltages $V_{Sn1}$, $V_{Sn2}$ and $V_{Sn3}$ satisfy all the above conditions, it is judged that rotation and settlement are carried out properly in the energization pattern n, the TPS voltage $V_{Sn3}$ is stored in the RAM 23d as a learned value of the magnetic pole position of the rotor at the first step position, the above energization pattern n specifying the learned value of the magnetic pole position of the rotor is also stored in the RAM 23d, and the pattern is renewed (n=n+1) to complete the processing (step S107). The learned value of the magnetic pole position of the rotor at the first step position and the energization pattern n are used as reference values for the calculation of the rotation angle of the rotor obtained by the application of the throttle opening voltage when the key switch is on and the calculation of the energization phase (energization ratio of each phase) of the motor in accordance with the rotation angle of the rotor.

Figure 11:
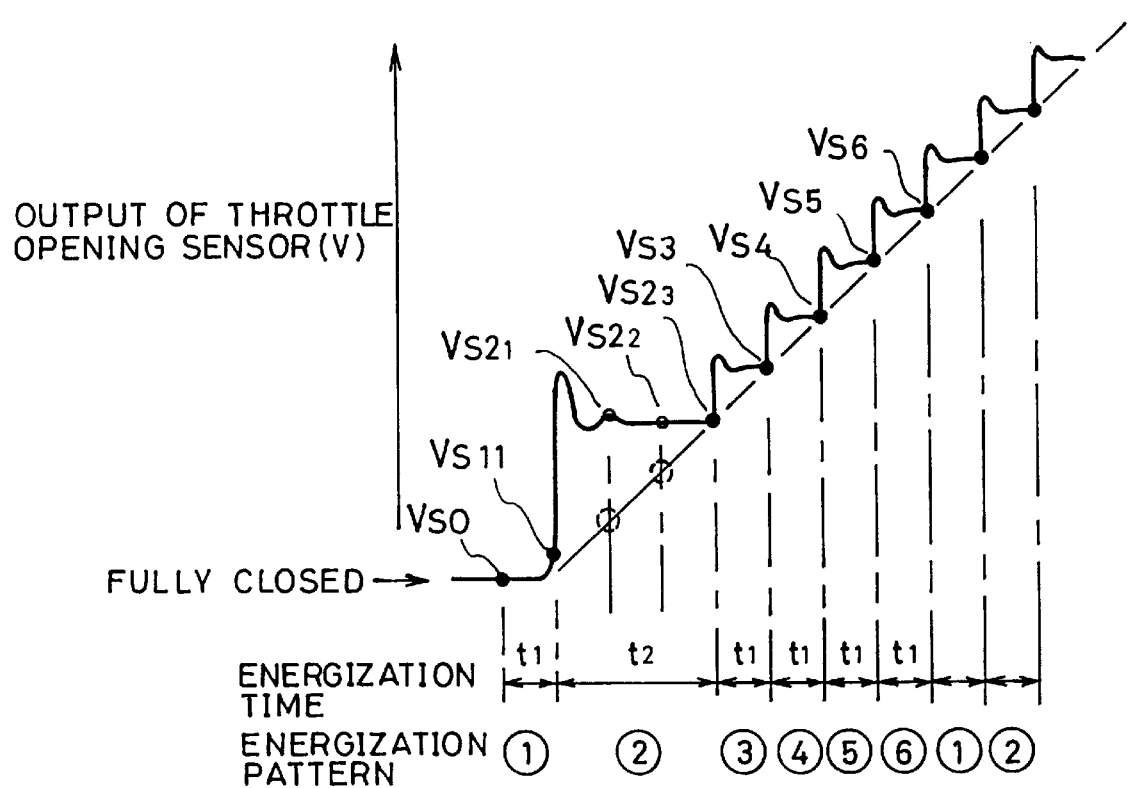
FIG. 11 is a time chart showing stepwise rotation in the rotor assembled state B according to Embodiment 1.

FIG. 11 is a time chart showing an example of the stepwise rotation of the rotor in the above-described assembly state B. After the TPS voltage $V_{S0}$ at the fully closed position is measured, the rotor 16 is driven stepwise in accordance with the energization pattern (1) for a predetermined energization time $t_1$, and the TPS voltage $V_{S11}$ is measured. Since the $V_{S11}$ does not satisfy $V_{S11} \geq (V_{S0} + V_{SC1})$, the energization pattern (1) is changed, the rotor 16 is driven in accordance with the energization pattern (2) for a predetermined energization time $t_1$, and the TPS voltage $V_{S21}$ when driving according to the energization pattern (2) is measured after the predetermined energization time $t_1$. Since the TPS voltage $V_{S21}$ satisfies $V_{S21} \geq (V_{S0} + V_{SC1})$, after the energization time $t_1$ is further kept, the TPS voltage $V_{S22}$ when driving in accordance with the energization pattern (2) is measured. Since $V_{S22}$ also satisfies $V_{S22} \geq (V_{S0} + V_{SC1})$, after the energization time $t_1$ is further kept, the TPS voltage $V_{S23}$ is measured. When $V_{S23}$ satisfies $V_{S23} \geq (V_{S0} + V_{SC1})$, it is judged whether $V_{S23}$ satisfies $|V_{S22} - V_{S23}| \leq V_{SC2}$. When $V_{S22}$ and $V_{S23}$ satisfy the above conditions, it is judged that rotation and settlement are carried out properly in the energization pattern (2), the TPS voltage $V_{S23}$ is stored in the RAM 23d as a learned value of the magnetic pole position of the rotor at the first step position (initial value), the above energization pattern (2) specifying the learned value of the magnetic pole position of the rotor is also stored in the RAM 23d, and the energization pattern is changed to the energization pattern (3). Since the magnetic pole position of the rotor is settled at a position where the TPS voltage is equal to $V_{S23}$ as described above, the rotor 16 rotates at an angle of 30° each time according to the energization patterns (3) to (6) and settles at positions where the TPS voltage is equal to $V_{S3}$ to $V_{S6}$, respectively. Therefore, the calculation result of the fully closed position of the Throttle valve 11 obtained by the extrapolation method using the first and second learned values of the magnetic pole position of the rotor ($V_{S23}$ and $V_{S3}$) is almost equal to the TPS voltage value $V_{S0}$ at the fully closed position, and the detection error (ER0) of the magnetic pole position at the fully closed position of the throttle valve is extremely small.

Figure 12:
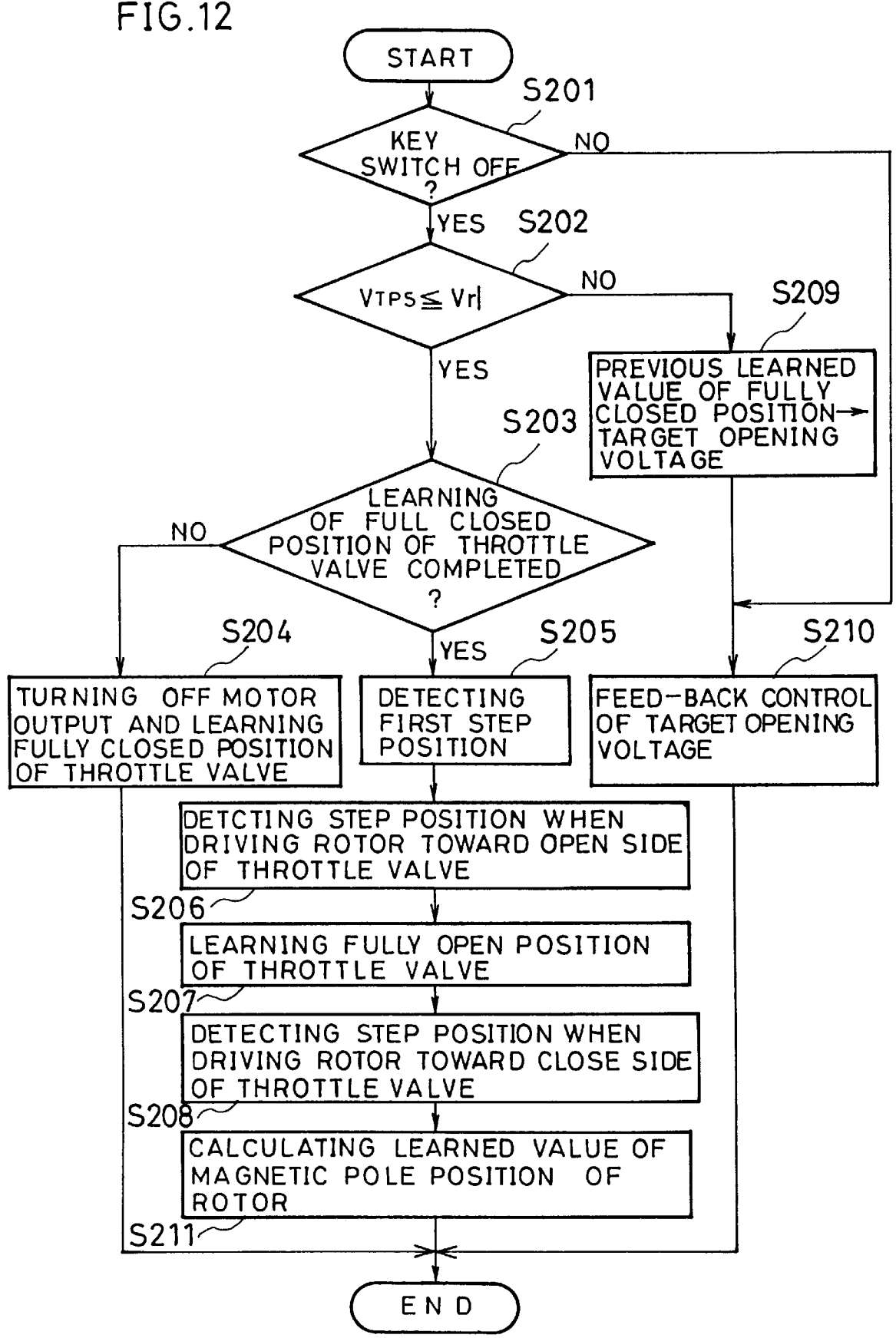
FIG. 12 is a control flow chart for learning the magnetic pole position of a rotor according to Embodiment 1.
Figure 13:
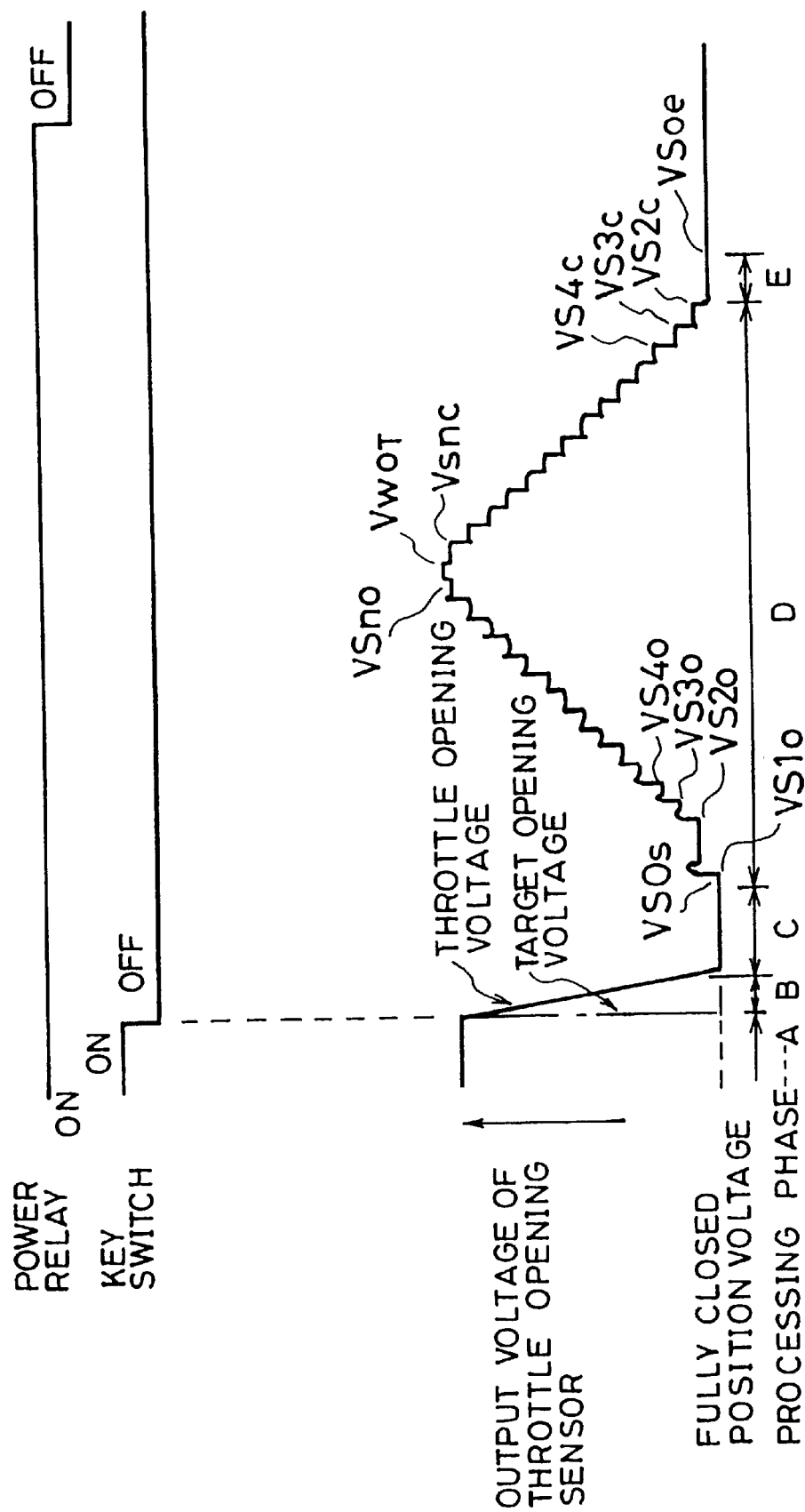
FIG. 13 is a control time chart for learning the magnetic pole position of a rotor according to Embodiment 1.

A description is subsequently given of the processing of learning the fully closed position of the throttle valve and the magnetic pole position of the rotor when the key switch is off with reference to a flow chart shown in FIG. 12 and a time chart shown in FIG. 13. Whether the key switch is off is judged by the key switch ON/OFF judging means 31 (step S201). When the key switch is not off, the routine proceeds to step S210 to carry out the feedback control of the opening position of the throttle valve so that the opening of the throttle valve should agree with the target opening (processing phase A of FIG. 13).

When the key switch is off, it is judged whether the throttle opening voltage $V_{TPS}$ is equal to or smaller than a predetermined opening voltage $V_{r1}$ (step S202). When $V_{TPS} > V_{r1}$, the routine proceeds to step S209 to set the previously learned value of the fully closed position of the throttle valve as the target opening and then to step S201 to carry out the feedback control of the opening position of the throttle valve (processing phase B of FIG. 13). When the throttle opening voltage $V_{TPS}$ is equal to or smaller than the predetermined opening voltage $V_{r1}$, it is judged whether the learning of the fully closed position of the throttle valve is completed (step S203). When the learning is not completed, the routine proceeds to step S210 to turn off the motor drive signal to return the throttle valve 11 to its fully closed position by the urging force of the return spring 14 and carry out the learning of the fully closed position of the throttle valve (processing phase C of FIG. 13), whereby the throttle opening voltage $V_{TPS}$ at the fully close position of the throttle valve is stored in the RAM 23d as the fully closed position $V_{S0s}$ of the throttle valve.

When it is judged in the above step S203 that the learning of the fully closed position of the throttle valve is completed, the first step position $V_{S10}$ when driving the rotor stepwise toward the open side of the throttle valve in the learning of the magnetic pole position of the rotor is detected (processing phase D of FIG. 13) (step S205). Thereafter, the rotor 16 is driven toward the fully open side of the throttle valve in accordance with an energization pattern from the stepwise drive energization pattern setting means 28 at intervals of a predetermined energization time $t_1$ (for example, 75 ms) from the stepwise drive energization time setting means 29, and each step position is stored in the RAM 23d as a throttle opening voltage value ($V_{S20}$, $V_{S30}$, $V_{S40}$ . . . ) (step S206). Further, the amount of a change in step position ($V_{wot}-V_{Sn0}$) which is a difference between the detected step position $V_{wot}$ of the rotor 16 and a step position $V_{Sn0}$ before the step position $V_{wot}$ is obtained. When the amount of a change in step position is equal to or smaller than a predetermined value $V_{r2}$ and the number of steps from the fully closed position is smaller than a predetermined number of steps, it is judged that the throttle valve 11 is at its fully open position and the step position $V_{wot}$ is stored in the RAM 23d as a learned value of the fully open position of the throttle valve (step S207).

When the learning of the fully open position of the throttle valve is completed, as the stepwise drive energization pattern setting means 28 changes the energization patterns backward (from (6) to (5), (4), (3) . . . (1)) to drive the rotor 16 stepwise from the fully open position of the throttle valve in the direction of fully closing the throttle valve, and each step position is stored in the RAM 23d as a throttle opening voltage value ($V_{Snc}$, . . . $V_{S4C}$, $V_{S3C}$, $V_{S2C}$) (step S208). When the throttle valve 11 is returned to its fully closed position again by the above stepwise driving, the throttle opening voltage $V_{TPS}$ at the fully closed position is stored in the RAM 23d as the fully closed position $V_{S0e}$ of the throttle valve after the learning operation of the magnetic pole position of the rotor, an average value $V_{Sn}$ ($V_{Sn}=(V_{Sn0}+V_{Snc})/2$) of the step position $V_{Sn0}$ on the open side of the throttle valve and the step position $V_{Snc}$ on the close side of the throttle valve is calculated as a learned value of each step position, and this learned value $V_{Sn}$ of the step position is stored in the backup RAM 23d as a learned value of the magnetic pole position of the rotor and written to the EEPROM 32 (step S211) to complete the processing of learning the magnetic pole position of the rotor. The above steps S205 to S208 correspond to the processing phase D in FIG. 13, and the above step S211 corresponds to the processing phase E. In FIG. 13, an unshown power relay is a relay for supplying power to the device 20 for controlling the volume of intake air for an engine and is set to be turned off a predetermined time (for example, 7 sec) after the key switch is turned off.

When power supply to the device 20 for controlling the volume of intake air for an engine is cut, the RAM 23d is cleared. Therefore, right after the removal of a battery, that is, power supply to the device 20 for controlling the volume of intake air for an engine is resumed, the previously learned value of the magnetic pole position of the rotor is read from the EEPROM 32 and stored in the RAM 23d. Further, at intervals of a predetermined number of times of the ON/OFF operation of the key switch of the key switch ON/OFF judging means 31 as the learning start judging means, that is, the reading operation of the learned value of the magnetic pole position of the rotor, a learned value calculated by the rotor magnetic pole position learning means 23 is written to the EEPROM 32 to renew the learned value.

A description is subsequently given of the operation of the device 20 for controlling the volume of intake air for an engine when the key switch is turned on after the learning of the magnetic pole position of the rotor is completed.

When the key switch is turned on after the learning of the magnetic pole position of the rotor is completed, the device 20 for controlling the volume of intake air for an engine carries out the feedback control of the opening position of the throttle valve so that the throttle opening should agree with the target opening. That is, the target opening setting means 21 calculates and sets a target throttle opening $\theta_0$ based on various car data such as an output value $V_{aps}$ from the accelerator opening sensor (APS), engine speed Ne, car speed Va and engine cooling water temperature Ta. The motor current calculating means 22 calculates an opening difference $\Delta\theta=(\theta_0-\theta_r)$ from the target opening $\theta_0$ of the throttle valve from the target opening setting means 21 and the actual opening $\theta_r$ of the throttle valve from the throttle opening sensor (TPS) 13. When $\Delta\theta$ is positive, the motor current calculating means 22 calculates such a motor phase current as to increase the phase current of the brushless motor 18 as the actual opening $\theta_r$ of the throttle valve is smaller than the target opening $\theta_0$ of the throttle valve. When $\Delta\theta$ is negative, the means 22 calculates such a motor phase current as to reduce the phase current of the brushless motor 18 as the actual opening $\theta_r$ of the throttle valve is larger than the target opening $\theta_0$ of the throttle valve. For the calculation of the motor phase current from the opening difference $\Delta\theta$, a PID control method is generally used. The PID control of the motor phase current Im functions to control the phase current Im so that the functions to control the phase current Im so that the above $\Delta\theta$ represented by the following expression (5) becomes "0".

$$Im=Im_0+K_P\cdot\Delta\theta+K_1\cdot\Sigma\Delta\theta dt+K_D\cdot\Delta\theta/dt \qquad (5)$$

Im: motor phase current obtained by PID calculation
$Im_0$: phase current for target opening $\theta_0$ of throttle valve
$K_P$: proportional gain
$K_I$: integral gain
$K_D$: differential gain The calculation result of the motor phase current Im obtained by the above expression (5) is applied to the motor control means 26. Meanwhile, the rotor rotation angle calculating means 24 calculates the rotation angle of the rotor 16 based on a throttle opening signal output $V_{TPS}$ from the throttle opening sensor 13 and a learned value $V_{Sn}$ of the magnetic pole position of the rotor from the rotor magnetic pole position learning means 23 and outputs it to the motor energization phase calculating means 25. The motor energization phase calculating means 25 calculates an energization ratio for each stator coil 17 independently based on the rotation angle of the rotor. The motor control means 26 outputs to the motor drive means 27 a PWM duty corresponding to a current value Is for each stator coil 17 based on the current value Im from the motor current calculating means 22 and the energization ratio from the motor energization phase calculating means 25. The motor drive means 27 turns on and off the switching elements according to a PWM duty drive signal corresponding to the current value Is for each stator coil 17 and supplies a current to desired phases of the brushless motor 18.

FIGS. 14a to 14c are diagrams showing the relationship between the rotation angle of the rotor 16 of the brushless motor 18 and the current waveform and flux waveform of each phase and output torque (rotor torque) in a sinusoidal wave energization system. If a similar sinusoidal current Is shown in FIG. 14a having the same phase as a flux density $\Phi$ as shown in FIG. 14b is supplied to each phase of the stator coils 17 when each stator coil 17 intersects the flux density Φ which changes sinusoidally by the rotation of the rotor 16 within the stator coils 17, a torque Ts of each phase generated by the energization can be expressed by the following expression.

$$Ts = k \cdot \Phi \cdot Is \text{ ($k$ is a constant)}$$

The torque of the rotor of the brushless motor is expressed by a synthesis vector of the generated torques Ts of U, V and W phases and an output torque without a ripple as shown in FIG. 14c can be obtained by the rotation angle of the rotor.

In this sinusoidal energization system, since an energization current to be supplied to each phase must be changed by sinusoidal waves according to the rotation angle of the rotor, the rotation angle of the rotor 16 must be detected with accuracy. In Embodiment 1, as described above, the rotation angle γ of the rotor 16 is calculated by the extrapolation method using the throttle opening signal output $V_{TPS}$ and the learned value $V_{Sn}$ of the magnetic pole position of the rotor from the rotor magnetic pole position learning means 23 to obtain the energization ratio of each stator coil 17, and a PWM duty corresponding to the current value Is of each stator coil 17 is output to the motor drive means 27 so as to change an energization current to be supplied to each phase by sinusoidal waves according to the rotation angle of the rotor.

The relationship between the rotation angle γ of the rotor and the PWM duty of each phase can be expressed by the following expressions (6) to (8).

$$PWM \text{ duty } 1 = PWM \text{ duty} \times \sin 2\gamma \quad (6)$$

$$PWM \text{ duty } 2 = PWM \text{ duty} \times \sin 2(\gamma - 60°) \quad (7)$$

$$PWM \text{ duty } 3 = PWM \text{ duty} \times \sin 2(\gamma + 60°) \quad (8)$$

γ: rotation angle of rotor (°)

According to Embodiment 1, when electricity is applied to each stator coil 17 of the brushless motor 18 for a predetermined energization time in accordance with a plurality of energization patterns to drive the brushless motor 18 stepwise and the first step position of the rotor 1 is detected, an energization time for a first step is made longer than the above predetermined energization time to carry out the learning of the magnetic pole position of the rotor after the first step rotation and settlement of the rotor 16, and a current Is to be applied to the stator coils 17 is controlled based on the learned value $V_{Sn}$ of the magnetic pole position of the rotor obtained by this learning of the magnetic pole position of the rotor and the output $V_{TPS}$ of the throttle opening sensor. Therefore, the learning of the accurate magnetic pole position of the rotor can be carried out without adjusting the relationship between the magnetic pole position of the rotor 16 of the brushless motor 18 and the position of the stator coils 17 at the time of assembly, and an energization current to be supplied to each phase of the stator coils 17 can be changed accurately by sinusoidal waves according to the rotation angle of the rotor. Consequently, an abrupt change in the torque of the brushless motor 18 which occurs when the stator coils 17 are switched can be suppressed without using a high-precision position detector, and the controllability of the energization current can be improved.

Embodiment 2

In the above Embodiment 1, the throttle opening voltage $V_{SO}$ at the fully closed position of the throttle valve is made a throttle opening voltage $V_{SOs}$ at the fully closed position of the throttle valve obtained in the processing phase C (see FIG. 13) before the learning operation of the magnetic pole position of the rotor. In Embodiment 2, the learned value $V_{SO}$ of the fully closed position of the throttle valve is stored in the RAM 23d as an average value of throttle opening voltages ($V_{SOs}$ and $V_{SOe}$) at the fully closed position of the throttle valve before and after the learning operation of the magnetic pole position of the rotor. Therefore, the accuracy of the learned value $V_{SO}$ of the fully closed position of the throttle valve can be improved by detecting the fully closed position of the throttle valve before and after each rotation of the rotor 16.

Embodiment 3

In Embodiment 3, the amount of the detection error of the magnetic pole position which is produced by the urging force of the return spring 14 is obtained in advance and the learned value $V_{Sn}$ of the magnetic pole position of the rotor obtained by the rotor magnetic pole position learning means 23 when the key switch is turned off in Embodiment 1 is corrected using a predetermined value $V_{sp}$ corresponding to the amount of the detection error of the magnetic pole position. That is, since a load torque generated by the urging force of the return spring 14 is applied to the rotor 16 when initialization operation for learning the magnetic pole position of the rotor is carried out, the rotor 16 settles at a position where the generation torque of the brushless motor 18 at the time of initialization operation and the load torque are well balanced. Since this settled position differs from the settled position of the rotor 16 when it has no load, this difference is obtained in advance as a TPS output voltage $V_{sp}$ corresponding to the difference and the learned value $V_{Sn}$ of the magnetic pole position of the rotor is corrected by $V_{sp}$ to improve the accuracy of the learned value of the magnetic pole position of the rotor and enhance the responsibility of the brushless motor.

As described above, the method of controlling the volume of intake air for an engine according to the first aspect of the present invention comprises driving the motor stepwise by applying electricity to each stator coil of the motor for a predetermined energization time in accordance with a plurality of energization patterns, making an energization time for a first step longer than the predetermined energization time at the time of detecting the first step position of the rotor so as to carry out the learning of the magnetic pole position of the rotor after the first step rotation and settlement of the rotor, and controlling a current to be applied to each stator coil based on a learned value of the magnetic pole position of the rotor obtained by the learning of the magnetic pole position of the rotor and the output of the throttle opening sensor. Therefore, the learning of the accurate magnetic pole position of the rotor can be carried out, and an energization current to be applied to each phase of the stator coils can be changed accurately by sinusoidal waves according to the rotation angle of the rotor. Consequently, the controllability of the energization current of the motor can be improved without using a high-precision position detector.

The device for controlling the volume of intake air for an engine according to the second aspect of the present invention comprising stepwise drive pattern setting means for setting a plurality of energization patterns for driving the motor stepwise, stepwise drive energization time setting means for setting an energization time for each of the above energization patterns, rotor step position detection means for detecting which one of the energization patterns is used to drive the motor stepwise, and rotor magnetic pole position learning means for detecting and learning the position of magnetic poles provided in the above rotor based on the output of the throttle opening sensor is characterized in that an energization time for a first step is made longer than the predetermined energization time at the time of detecting the first step position of the rotor so as to carry out the learning of the magnetic pole position of the rotor after the first step rotation and settlement of the rotor. Therefore, the learning of the accurate magnetic pole position of the rotor can be carried out.

The device for controlling the volume of intake air for an engine according to the third aspect of the present invention comprising learning start judging means for judging that the learning of the magnetic pole position of the rotor can be started when the ignition switch is off is characterized in that when the learning start judging means judges that learning can be started, the learning of the magnetic pole position of the rotor is carried out. Therefore, the learning operation of the magnetic pole position of the rotor during the running of the engine can be prevented and danger caused by an abnormal rise in engine speed and abnormal acceleration of a vehicle can be prevented.

The device for controlling the volume of intake air for an engine according to the fourth aspect of the present invention is characterized in that the learning start judging means for judging that the learning of the magnetic pole position of the rotor can be started judges that the learning of the magnetic pole position of the rotor can be started when the ignition switch is off and the engine is not running. Therefore, the learning operation of the magnetic pole position of the rotor during the running of the engine can be prevented with more certainty.

The device for controlling the volume of intake air for an engine according to the fifth aspect of the present invention comprising throttle valve fully closed position learning means for learning the fully closed position of the throttle valve based on the output of the throttle opening sensor is characterized in that the learning of the fully closed position of the throttle valve is carried out before the learning of the magnetic pole position of the rotor. Therefore, the fully closed position of the throttle can be detected accurately and the detection of the first step rotation of the rotor by the rotor step position detection means can be carried out with ease.

The device for controlling the volume of intake air for an engine according to the sixth aspect of the present invention is characterized in that when a throttle opening voltage after an elapse of a predetermined time right after the output of an energization pattern is equal to or larger than the total of a learned value of the fully closed position of the throttle valve and a predetermined voltage value, rotor step position detection means judges that the energization pattern is an energization pattern for first step rotation. Therefore, the settlement of the rotor after rotation can be carried out without fail irrespective of the relationship between the magnetic pole position of the rotor and the position of the stator coils when the throttle valve is fully closed.

The device for controlling the volume of intake air for an engine according to the seventh aspect of the present invention is characterized in that an energization pattern to be applied to each stator coil of the motor is not renewed for a predetermined time when the rotor step position detection means carries out the detection of first step rotation. Therefore, since the energization pattern in which the magnetic pole position of the rotor and the position of the stator coils when the throttle valve is fully closed match is maintained, the settlement of the rotor after each rotation can be carried out without fail.

The device for controlling the volume of intake air for an engine according to the eighth aspect of the present invention is characterized in that an energization pattern to be applied to each stator coil of the motor is maintained for a preset energization time for the first step rotation when the rotor step position detection means carries out the detection of the first step rotation and that a throttle opening voltage which is smaller than a preset variation width in the above energized state is taken as a magnetic pole position of the rotor at the first step position. Therefore, the learning of the accurate magnetic pole position of the rotor can be carried out irrespective of the relationship between the magnetic pole position of the rotor and the position of the stator coils when the throttle valve is fully closed, the controllability of the energization current of the motor can be improved without using a high-precision position detector, and an abrupt change in the torque of the motor which occurs when the stator coils are switched can be prevented.

The device for controlling the volume of intake air for an engine according to the ninth aspect of the present invention comprising initial value storing means is characterized in that a learned magnetic pole position of the rotor at the first step position and an energization pattern for the first step are stored in the initial value storing means at the time of detecting the first step rotation of the rotor according to the energization pattern and used as reference values for the calculation of the rotation angle of the rotor using a throttle opening. Therefore, the settlement of the rotor after each rotation can be carried out without fail.

The device for controlling the volume of intake air for an engine according to the tenth aspect of the present invention is characterized in that the energization time of an energization pattern to be applied to each stator coil of the motor is made a predetermined energization time preset by the stepwise drive energization time setting means after the detection of the magnetic pole position of the rotor at the first step position. Therefore, the learning of the magnetic pole position of the rotor can be carried out efficiently.

The device for controlling the volume of intake air for an engine according to the eleventh aspect of the present invention comprising throttle valve fully open position learning means for learning the fully open position of the throttle valve from the output of the throttle opening sensor is characterized in that the throttle valve fully open position learning means carries out the learning of the fully open position of the throttle valve when a step position of the rotor detected by the rotor step position detection means is within a predetermined step position range and a difference between a learned value of the magnetic pole position of the rotor at the step position and a learned value of the magnetic pole position of the rotor at a step position right before the detection of the above step position is equal to or small than a predetermined value. Therefore, the fully open position of the throttle valve can be learned, a value indicative of the fully open position of the throttle valve from the target throttle opening setting means becomes accurate, and a current larger than required can be prevented from running into the motor.

The device for controlling the volume of intake air for an engine according to the twelfth aspect of the present invention is characterized in that a learned value calculated by the rotor magnetic pole position learning means is stored in the backup RAM and the EEPROM. Therefore, the learned value of the magnetic pole position of the rotor can be stored and kept after the removal of a battery.

The device for controlling the volume of intake air for an engine according to the thirteenth aspect of the present invention is characterized in that a learned value of the magnetic pole position of the rotor is read from the EEPROM and stored in the backup RAM right after the removal of a battery. Therefore, since the previously learned value of the magnetic pole position of the rotor can be read from the RAM, the control of the throttle valve can be carried out right after judging the start of learning.

The device for controlling the volume of intake air for an engine according to the fourteenth aspect of the present invention is characterized in that a learned value calculated by the rotor magnetic pole position learning means is written to the EEPROM to renew the learned value of the magnetic pole position of the rotor at intervals of a predetermined number of times of the learning start judging operation of the learning start judging means. Therefore, the volume of data to be written to the EEPROM is limited and the durability of the EEPROM can be ensured.

The device for controlling the volume of intake air for an engine according to the fifteenth aspect of the present invention comprising throttle valve fully closed position learning means for learning the fully closed position of the throttle valve based on the output of the throttle opening sensor is characterized in that the learning of the fully closed position of the throttle valve is carried out after the learning of the magnetic pole position of the rotor. Therefore, the learning accuracy of the fully closed position of the throttle valve can be improved.

The device for controlling the volume of intake air for an engine according to the sixteenth aspect of the present invention comprising throttle valve fully closed position learning means for learning the fully closed position of the throttle valve based on the output of the throttle opening sensor is characterized in that the learning of the fully closed position of the throttle valve is carried out before and after the learning of the magnetic pole position of the rotor and an average value of the learned values of the fully closed position of the throttle valve is taken as a learned value of the fully closed position of the throttle valve. Therefore, the accuracy of the learned value of the fully closed position of the throttle valve can be further improved.

The device for controlling the volume of intake air for an engine according to the seventeenth aspect of the present invention is characterized in that when the opening of the throttle valve is equal to or larger than a predetermined opening at the time of the learning start judging means' judging that learning can be started, a learned value of the fully closed position of the throttle valve fully closed position learning means is used as a target opening until the opening of the throttle valve falls below the predetermined opening and that the throttle valve is returned to its fully closed position by the feedback control of the opening. Therefore, the bouncing of the throttle valve at its fully closed position by the urging force of the return spring can be suppressed, the learning time can be shortened, and the learning accuracy of the fully closed position of the throttle valve can be improved.

The device for controlling the volume of intake air for an engine according to the eighteenth aspect of the present invention is characterized in that when the opening of the throttle valve is equal to or smaller than a predetermined opening at the time of the learning start judging means' judging that learning can be started, the output of the drive signal of the motor drive means is stopped and the throttle valve is returned to its fully closed position by the urging force of the return spring. Therefore, the bouncing of the throttle valve at its fully closed position by the urging force of the return spring can be suppressed, the learning time can be shortened, and the learning accuracy of the fully closed position of the throttle valve can be improved.

The device for controlling the volume of intake air for an engine according to the nineteenth aspect of the present invention is characterized in that the throttle valve fully closed position learning means stores an output value of the throttle opening sensor after an elapse of a predetermined time from the time when the throttle valve opening falls below a predetermined opening and a change in opening voltage falls below a predetermined value as a learned value of the fully closed position of the throttle valve. Therefore, the learning accuracy of the fully closed position of the throttle valve can be further improved.

The device for controlling the volume of intake air for an engine according to the twentieth aspect of the present invention is characterized in that the learning of the magnetic pole position of the rotor is not carried out when the learning of the fully closed position of the throttle valve is not completed. Therefore, the fully closed position of the throttle valve can be detected accurately, the detection of the first step rotation by the rotor step position detection means can be carried out with ease, and the erroneous learning of the magnetic pole position of the rotor at the first step position can be prevented.

What is claimed is:

1. A method for controlling the volume of intake air for an engine by controlling a current to be applied to stator coils of a motor having a rotor and the stator coils to adjust the opening of a throttle valve, the method comprising:

driving the motor stepwise by applying electricity to each of the stator coils of the motor for a predetermined energization time in accordance with a plurality of energization patterns;

making an energization time for a first step longer than the predetermined energization time at the time of detecting a first step position of the rotor so as to carry out the learning of the magnetic pole positions of the rotor for detecting and learning the position of magnetic poles provided in the rotor based on the output of a throttle opening sensor after the first step rotation and settlement of the rotor; and controlling a current to be applied to the stator coils based on a learned value of the magnetic pole position of the rotor obtained by the learning of the magnetic pole position of the rotor and the output of the throttle opening sensor.

2. A device for controlling the volume of intake air for an engine by controlling a current to be applied to stator coils of a motor having a rotor and the stator coils based on the output of a throttle opening sensor for detecting the opening of a throttle valve provided in an intake air passage of the engine to adjust the opening of the throttle valve, said device comprising:

stepwise drive energization pattern setting means for setting a plurality of energization patterns for driving the motor stepwise;

stepwise drive energization time setting means for setting an energization time for each of the energization patterns;

rotor step position detection means for detecting which one of the energization patterns is used to drive the motor stepwise; and rotor magnetic pole position learning means for detecting and learning the position of magnetic poles provided in the rotor based on the output of the throttle opening sensor, wherein an energization time for a first step is made longer than the predetermined energization time at the time of detecting a first step position of the rotor so as to carry out the learning of the magnetic pole positions of the rotor after the first step rotation and settlement of the rotor.

3. The device for controlling the volume of intake air for an engine according to claim 2 further comprising learning start judging means for judging that the learning of the magnetic pole positions of the rotor can be started when an ignition switch is off, wherein when the learning start judging means judges that learning can be started, the learning of the magnetic pole positions of the rotor is carried out.

4. The device for controlling the volume of intake air for an engine according to claim 3, wherein the learning start judging means judges that the learning of the magnetic pole positions of the rotor can be started when the ignition switch is off and the engine is not running.

5. The device for controlling the volume of intake air for an engine according to claim 2 further comprising throttle valve fully closed position learning means for learning the fully closed position of the throttle valve based on the output of the throttle opening sensor, wherein the learning of the fully closed position of the throttle valve is carried out before the learning of the magnetic pole positions of the rotor.

6. The device for controlling the volume of intake air for an engine according to claim 5, wherein when a throttle opening voltage after an elapse of a predetermined time right after the output of an energization pattern is equal to or larger than the total of a learned value of the fully closed position of the throttle valve and a predetermined voltage value, the rotor step position detection means judges that the energization pattern is an energization pattern for first step rotation.

7. The device for controlling the volume of intake air for an engine according to claim 2, wherein an energization pattern to be applied to each stator coil of the motor is not renewed when the rotor step position detection means carries out the detection of first step rotation.

8. The device for controlling the volume of intake air for an engine according to claim 7, wherein an energization pattern to be applied to each stator coil of the motor is maintained for a preset energization time for a first step when the rotor step position detection means carries out the detection of the first step rotation, and a throttle opening voltage which is smaller than a preset variation width in the energized state is taken as a magnetic pole position of the rotor at the first step position.

9. The device for controlling the volume of intake air for an engine according to claim 8 further comprising initial value storing means, wherein a learned magnetic pole position of the rotor at the first step position and an energization pattern for the first step are stored in the initial value storing means at the time of detecting the first step rotation of the rotor according to the energization pattern.

10. The device for controlling the volume of intake air for an engine according to claim 2, wherein the energization time of an energization pattern to be applied to each stator coil of the motor is made a predetermined energization time preset by the stepwise drive energization time setting means after the detection of the magnetic pole position of the rotor at the first step position.

11. The device for controlling the volume of intake air for an engine according to claim 2 further comprising throttle valve fully open position learning means for learning the fully open position of the throttle valve from the output of the throttle opening sensor, wherein the throttle valve fully open position learning means carries out the learning of the fully open position of the throttle valve when a step position of the rotor detected by the rotor step position detection means is within a predetermined step position range and a difference between a learned value of the magnetic pole position of the rotor at the step position and a learned value of the magnetic pole position of the rotor at a step position right before the detection of the above step position is equal to or smaller than a predetermined value.

12. The device for controlling the volume of intake air for an engine according to claim 2, wherein a learned value calculated by the rotor magnetic pole position learning means is stored in a backup RAM and an EEPROM.

13. The device for controlling the volume of intake air for an engine according to claim 12, wherein a learned value of the magnetic pole position of the rotor is read from the EEPROM and stored in the backup RAM right after the removal of a battery.

14. The device for controlling the volume of intake air for an engine according to claim 12, wherein a learned value calculated by the rotor magnetic pole position learning means is written to the EEPROM at intervals of a predetermined number of times of the learning start judging operation of the learning start judging means.

15. The device for controlling the volume of intake air for an engine according to claim 2 further comprising throttle valve fully closed position learning means for learning the fully closed position of the throttle valve based on the output of the throttle opening sensor, wherein the learning of the fully closed position of the throttle valve is carried out after the learning of the magnetic pole positions of the rotor.

16. The device for controlling the volume of intake air for an engine according to claim 2 further comprising throttle valve fully closed position learning means for learning the fully closed position of the throttle valve based on the output of the throttle opening sensor, wherein the learning of the fully closed position of the throttle valve is carried out before and after the learning of the magnetic pole position of the rotor and an average value of the learned values of the fully closed position of the throttle valve is taken as a learned value of the fully closed position of the throttle valve.

17. The device for controlling the volume of intake air for an engine according to claim 5, wherein when the opening of the throttle valve is equal to or larger than a predetermined opening at the time of the learning start judging means judging that learning can be started, a learned value of the fully closed position of the throttle valve fully closed position learning means is used as a target opening until the opening of the throttle valve falls below the predetermined opening and the throttle valve is returned to its fully closed position by the feedback control of the opening.

18. The device for controlling the volume of intake air for an engine according to claim 2, wherein when the opening of the throttle valve is equal to or smaller than a predetermined opening at the time of the learning start judging means judging that learning can be started, the output of the drive signal of the motor drive means is stopped.

19. The device for controlling the volume of intake air for an engine according to claim 5, wherein the throttle valve fully closed position learning means stores an output value of the throttle opening sensor after an elapse of a predetermined time from the time when the throttle valve opening falls below a predetermined opening and a change in opening voltage falls below a predetermined value as a learned value of the fully closed position of the throttle valve.

20. The device for controlling the volume of intake air for an engine according to claim 5, wherein the learning of the magnetic pole position of the rotor is not carried out when the learning of the fully closed position of the throttle valve is not completed.

21. The device for controlling the volume of intake air for an engine according to claim 2, wherein said rotor magnetic pole position leaning means corrects the learned position of the magnetic poles based upon a detection error produced by an urging force of a return spring acting on said throttle valve.

* * * * *